(12) United States Patent
Sambe

(10) Patent No.: US 10,497,017 B2
(45) Date of Patent: Dec. 3, 2019

(54) METHOD AND SYSTEM FOR DISTRIBUTING AND TRACKING EFFECTIVENESS OF PRODUCT RECOMMENDATIONS

(71) Applicant: TOSHIBA TEC KABUSHIKI KAISHA, Tokyo (JP)

(72) Inventor: Masanori Sambe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 763 days.

(21) Appl. No.: 14/988,354

(22) Filed: Jan. 5, 2016

(65) Prior Publication Data
US 2016/0203508 A1 Jul. 14, 2016

(30) Foreign Application Priority Data
Jan. 9, 2015 (JP) .................................. 2015-003430

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0255* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 2008/0215453 A1* | 9/2008 | Yoshii | ............... | G06Q 30/02 705/7.29 |
| 2008/0308630 A1* | 12/2008 | Bhogal | ............... | G06Q 30/02 235/383 |
| 2011/0085697 A1* | 4/2011 | Clippard | ............ | G06K 9/4652 382/100 |

(Continued)

FOREIGN PATENT DOCUMENTS

| | | |
|---|---|---|
| CN | 103679509 A | 3/2014 |
| CN | 104011754 A | 8/2014 |

(Continued)

OTHER PUBLICATIONS

Japanese Office Action dated Jun. 19, 2018 in counterpart Japanese Patent Application No. 2017-203290 (8 pages) (with machine translation).

(Continued)

*Primary Examiner* — Matthew T Sittner
(74) *Attorney, Agent, or Firm* — Kim & Stewart LLP

(57) ABSTRACT

A method of distributing purchase recommendations to a user terminal and tracking their effectiveness includes receiving an image of a product code captured from a user terminal at a store server through a wireless device, the store server connected to a first database from which the store server retrieves product information relating to the product code, the product information including one or more recommended products associated with the product, and a second database that tracks effectiveness of recommendations for each product, and transmitting the product information to the user terminal through the wireless device. The presence of at least one recommended product in the product information causes the self-registration program in the user terminal to display a user interface for accessing information about the recommended product on the user terminal and enable the store server to update the second database by tracking the user inputs made through the user interface.

6 Claims, 14 Drawing Sheets

(56) References Cited

U.S. PATENT DOCUMENTS

| | | | |
|---|---|---|---|
| 2013/0204729 A1* | 8/2013 | Sundaresan | G06Q 30/00 705/26.1 |
| 2013/0268392 A1* | 10/2013 | Chateau-Artaud | G06Q 30/0631 705/26.7 |
| 2013/0282519 A1* | 10/2013 | Xavier | G06Q 30/0631 705/26.7 |
| 2014/0040006 A1* | 2/2014 | Balestrieri | G06Q 30/02 705/14.41 |
| 2014/0164193 A1* | 6/2014 | Ando | G06Q 20/209 705/30 |
| 2014/0249905 A1 | 9/2014 | Mehler | |
| 2014/0279191 A1* | 9/2014 | Agarwal | G06Q 30/0633 705/26.7 |
| 2015/0026010 A1* | 1/2015 | Ellison | G06Q 30/0613 705/26.41 |
| 2015/0058160 A1* | 2/2015 | Cao | G06Q 30/0631 705/26.7 |
| 2015/0081699 A1* | 3/2015 | Leppanen | G06F 16/44 707/736 |
| 2015/0149468 A1* | 5/2015 | Shukla | G06F 16/35 707/740 |
| 2015/0220622 A1* | 8/2015 | Modarresi | G06F 16/283 707/748 |
| 2015/0286898 A1* | 10/2015 | Di | G06K 9/46 382/224 |
| 2015/0294011 A1* | 10/2015 | Tang | G06F 16/972 707/722 |
| 2016/0050129 A1* | 2/2016 | Hoyne | H04L 43/08 709/224 |
| 2016/0093081 A1* | 3/2016 | Kim | G06F 3/012 345/156 |
| 2016/0140622 A1* | 5/2016 | Wang | G06F 16/986 705/14.66 |
| 2016/0140829 A1* | 5/2016 | Romanoff | G06Q 10/06 340/540 |
| 2016/0180193 A1* | 6/2016 | Masters | G06K 9/00671 382/218 |
| 2016/0203508 A1* | 7/2016 | Sambe | G06Q 30/0242 705/14.41 |
| 2018/0225706 A1* | 8/2018 | Sambe | G06Q 30/0242 |

FOREIGN PATENT DOCUMENTS

| | | |
|---|---|---|
| JP | 2009-181414 A | 8/2009 |
| JP | 2010250798 A | 11/2010 |
| JP | 2013-254295 A | 12/2013 |

OTHER PUBLICATIONS

Chinese Office Action dated Dec. 28, 2018, mailed in counterpart Chinese Application No. 201610011639.9, 15 pages (with translation).

\* cited by examiner

METHOD AND SYSTEM FOR DISTRIBUTING AND TRACKING EFFECTIVENESS OF PRODUCT RECOMMENDATIONS

CROSS-REFERENCE TO RELATED APPLICATION

This application is based upon and claims the benefit of priority from Japanese Patent Application No. 2015-003430, filed Jan. 9, 2015, the entire contents of which are incorporated herein by reference.

FIELD

Embodiments described herein generally relate to a method and a system for distributing and tracking effectiveness of product recommendations.

BACKGROUND

In a self-service commodity data input system, the commodity registration by a cashier can be simplified by enabling a customer carrying a computing device having a wireless communication function to scan data of a commodity (product) the customer wants to purchase through the computing device.

In an electronic commerce system, information of a commodity related to a commodity to be purchased by the customer is provided to the customer for promotion of sales.

It would be desirable if effectiveness of the promotion can be quantitatively obtained by a retailer or a manufacturer of the commodity. In addition, it would be more desirable if such effectiveness can be obtained through secure data communication.

DETAILED DESCRIPTION

According to an embodiment, a method for distributing purchase recommendations to a user terminal and tracking effectiveness of the purchase recommendations, includes the steps of: providing a self-registration program in the user terminal using which (i) a user captures an image associated with a product the user desires to purchase and (ii) a product code is generated from the captured image of the product and transmitted to a wireless device that is connected to a store server over a network; receiving the captured image from the user terminal at a store server through the wireless device, the store server connected to a first database from which the store server retrieves product information relating to the product code, the product information relating to the product code including a product name, a unit price, and one or more recommended products associated with the product, and a second database that tracks effectiveness of recommendations for each product; and transmitting the product information to the user terminal through the wireless device. The presence of at least one recommended product in the product information causes the self-registration program in the user terminal to display a user interface for accessing information about the recommended product on the user terminal and enable the store server to update the second database by tracking the user inputs made through the user interface.

Embodiments of a commodity sales input support apparatus which can provide information of a commodity related to a commodity the customer wants to purchase and provide effectiveness of commodity recommendation based on the information, and a commodity sales processing system using the same, are described below with reference to the accompanying drawings.

In the embodiments, a commodity is recommended based on the information of a commodity related thereto. The recommended commodity refers to a commodity recommended by the store or the manufacturer of the commodity. For example, the recommended commodity is a commodity which can be purchased at a preferential price if purchased with the commodity.

Further, a commodity sales processing system in the embodiments causes a commodity data input system having the commodity sales input support apparatus to cooperate with an electronic receipt system. The commodity data input system is a self-service system which simplifies the commodity registration operation of the cashier by enabling the customer carrying an information terminal having a wireless communication function to walk along a sales floor and input the data of a commodity the customer wants to purchase into the information terminal. The electronic receipt system is a system which formats the information (receipt data) recorded on a receipt and downloads the electronic receipt data into the information terminal via, for example, the Internet, to enable the customer to receive a receipt electronically.

[Commodity Sales Processing System]

Figure 1:
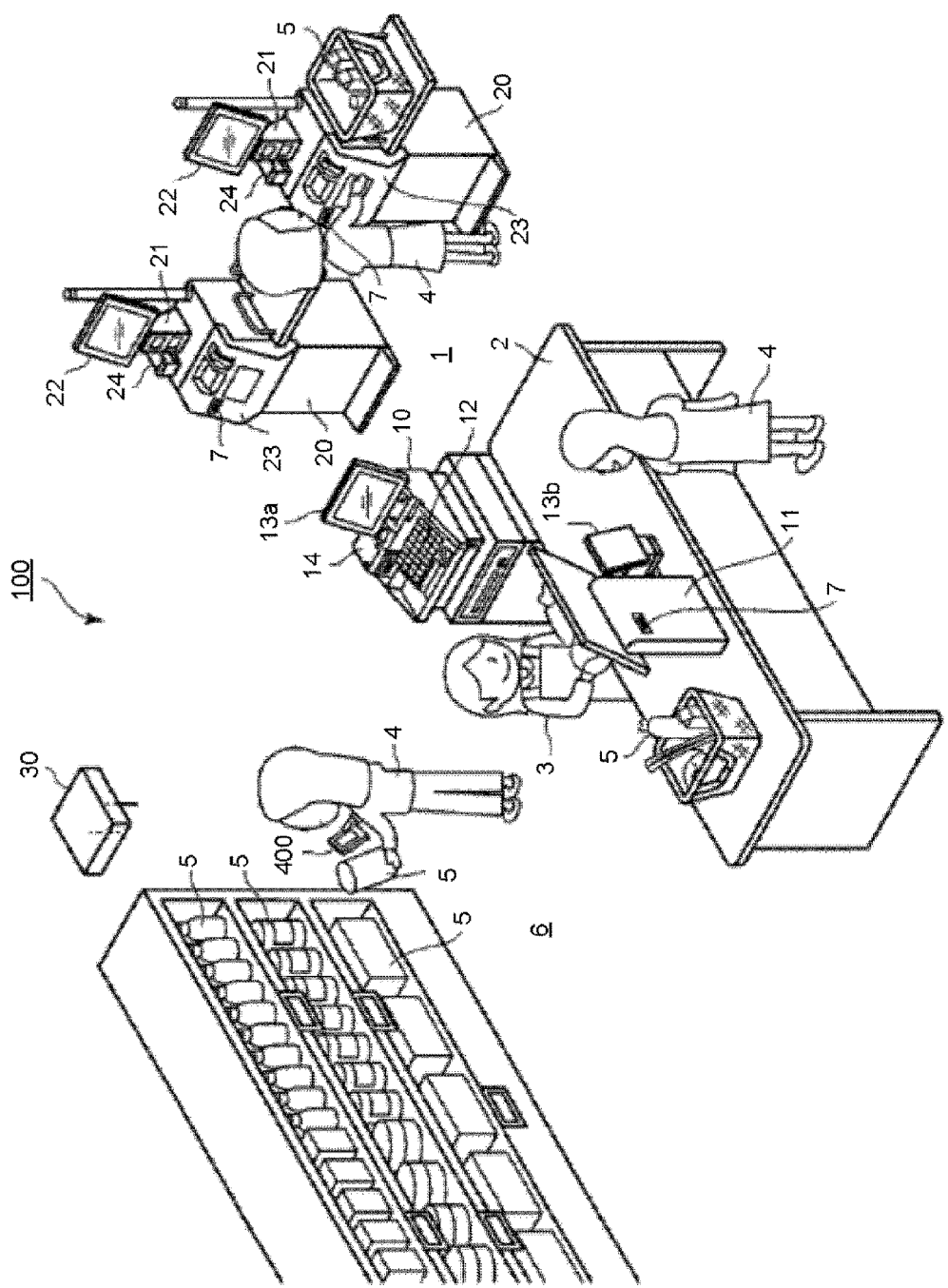
FIG. 1 schematically illustrates a retail store having a commodity sales processing system.
Figure 2:
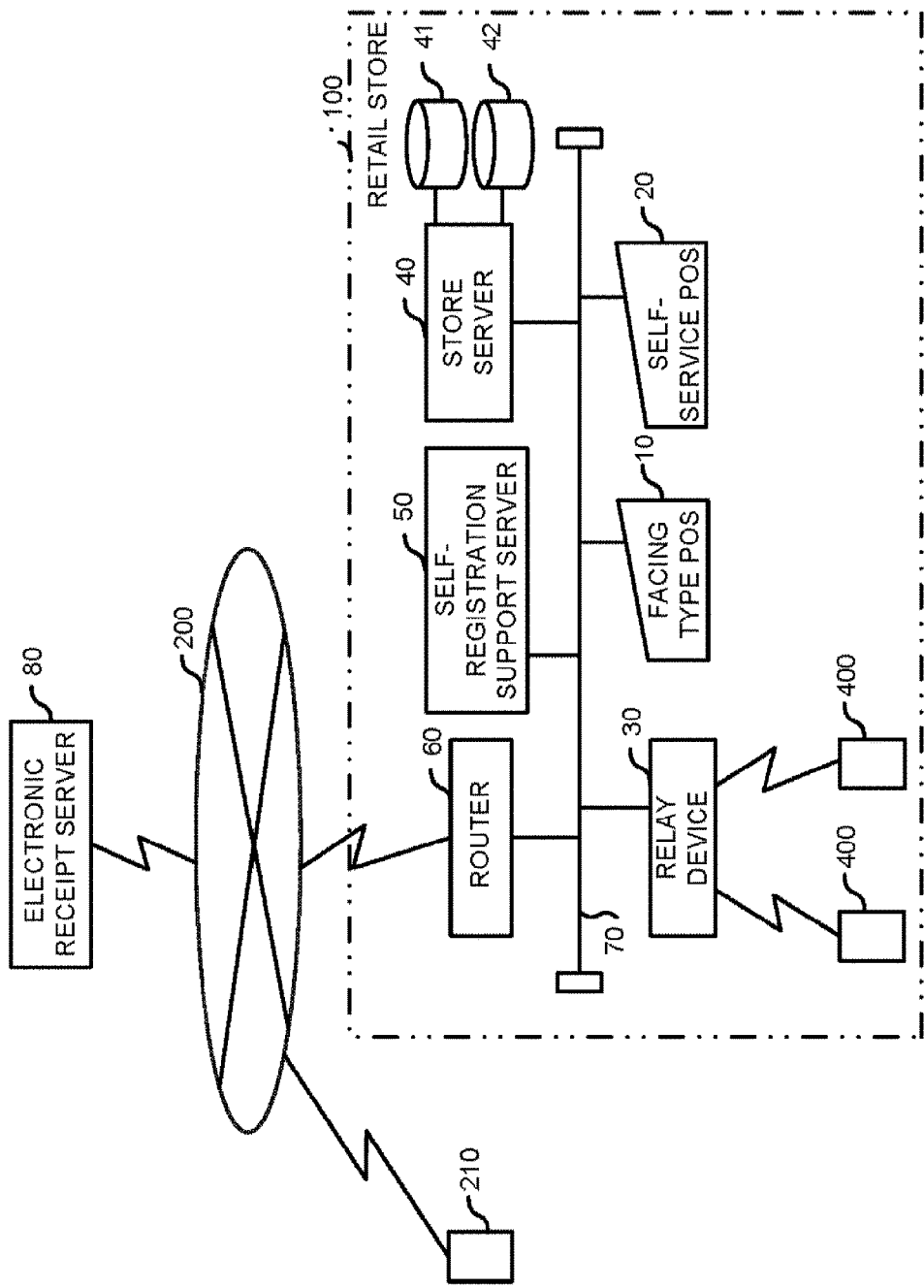
FIG. 2 is a block diagram of the commodity sales processing system.

FIG. 1 schematically illustrates a retail store 100 having a commodity sales processing system, and FIG. 2 is a block diagram of the commodity sales processing system.

As shown in FIG. 1 and FIG. 2, the commodity sales processing system includes, in the retail store 100, facing-type POS (Point of Sales) apparatuses 10, a self-service POS apparatus 20, and a relay device 30. Further, as shown in FIG. 2, the commodity sales processing system includes in the retail store 100 a store server 40, a self-registration support server (hereinafter referred to as a support server) 50, and a router 60. Moreover, in the retail store 100, the commodity sales processing system includes a LAN (Local Area Network) 70 to which the POS apparatuses 10 and 20, the relay device 30, the store server 40, the support server 50, and the router 60 are connected. The LAN 70 may be a wired or a wireless LAN. The router 60 relays data communication between the LAN 70 and a network 200.

The electronic receipt server 80 is connected with the network 200. The electronic receipt server 80 stores electronic receipt data. By accessing the electronic receipt server 80 from an information processing apparatus 210 connected with the network 200, a customer can view an electronic receipt on the information processing apparatus 210. The information processing apparatus 210 may be a personal computer, a smart phone, a mobile phone, a tablet terminal, or the like. The network 200 is, for example, an Internet or a mobile communication network.

Although only the commodity sales processing system of one store is shown in FIG. 2, the commodity sales processing systems of a plurality of retail stores 100 may be connected to the network 200. Moreover, the commodity sales processing systems of the retail stores 100 may share the electronic receipt server 80.

[POS Apparatus (Settlement Apparatus)]

As shown in FIG. 1, the facing-type POS apparatus 10 located at a checkout counter 2 in a settlement region 1 is operated by a cashier 3. The POS apparatus 10 includes a scanner 11 located on the checkout counter 2. The scanner 11 is also operated by the cashier 3. The cashier 3 faces, across the checkout counter 2, a customer 4 waiting in front of the checkout counter 2 for settlement. The cashier 3 reads, with the scanner 11, a barcode affixed on a commodity 5 to be purchased by the customer 4. The scanner 11 sends barcode data obtained by reading the barcode to the POS apparatus 10. The POS apparatus 10 specifies the commodity 5 according to the barcode data sent from the scanner 11 and registers the sales quantities and the sales amount of the commodity 5 in a transaction region in memory. Further, the POS apparatus 10 displays the commodity name, the sales quantities, the sales amount, and the total amount of commodities 5 registered in the transaction region on a display 13. The display 13 includes a display 13a for operator and a display 13b for customer.

After the commodities 5 purchased by the customer 4 are all registered, the cashier 3 inputs payment data into the POS apparatus 10. For example, the cashier 3 operates a keyboard 12 to input an amount paid by the customer. The POS apparatus 10 carries out a settlement process for the commodity transaction with the customer 4 according to the payment data. During the settlement process, the POS apparatus 10 drives a printer 14 to issue a receipt (hereinafter referred to as a paper receipt) by printing the details of the commodity transaction on receipt paper. If the customer 4 is an electronic receipt member (subscriber), then the issuing of the paper receipt may be optional.

The self-service POS apparatus 20 is located at the settlement region 1 for the customer 4 to operate. The POS apparatus 20 has a scanner 21, a touch panel 22, an automatic change dispenser 23, and a printer 24 for printing a receipt. The customer 4 standing in front of the POS apparatus 20 operates the scanner 21 to read the barcode affixed on a commodity 5 to be purchased by the customer 4. The POS apparatus 20 specifies the commodity 5 according to the barcode read by the scanner 21 and registers the sales quantities, the sales amount, and the like of the commodity 5 in a transaction region. Further, the POS apparatus 20 displays the commodity name, the sales quantities, the sales amount, and the total amount of commodities 5 registered in the transaction region, on the touch panel 22.

After the registration of the commodities 5 is completed, the customer 4 inputs payment data into the POS apparatus 20. For example, the customer 4 operates the touch panel 22 to select a payment method. If a cash payment is selected, the customer 4 puts cash into the automatic change dispenser 23. If an electronic money payment is selected, the customer 4 directs an electronic money card to a reader/writer (not shown). The POS apparatus 20 settles the commodity transaction for the customer 4 according to the payment data. During the settlement process, the POS apparatus 20 drives the printer 24 to issue a paper receipt on which the content of the commodity transaction is printed. If the customer 4 is an electronic receipt member (subscriber), then the issuing of the paper receipt may be optional.

In addition to or instead of the payment methods described above, the payment methods available in the POS apparatus 20 may further include other payment methods such as payment by credit card and payment with merchandise coupon. In addition to or instead of payment with cash, the payment methods available in the POS apparatus 10 may further include other payment methods such as payment with electronic money, payment by credit card, or payment with merchandise coupon.

The POS apparatus 10 or 20 is referred to as a settlement apparatus or a commodity sales data processing apparatus.

Figure 3:
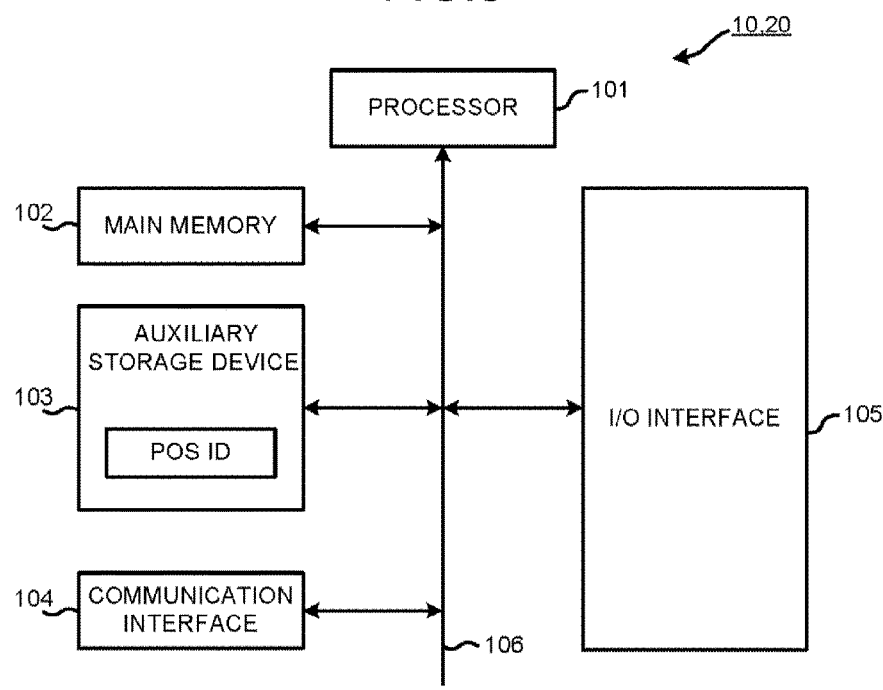
FIG. 3 is a block diagram of a POS apparatus in the commodity sales processing system.

FIG. 3 is a block diagram of the POS apparatus 10 or 20. The POS apparatus 10 or 20 includes a processor 101, a main memory 102, an auxiliary storage device 103, a communication interface 104, and an I/O (Input/Output) interface 105. The processor 101 is connected with the main memory 102, the auxiliary storage device 103, the communication interface 104, and the I/O (Input/Output) interface 105 by a system transmission path 106 including an address bus line, a data bus line, a control signal line, and the like.

The POS apparatus 10 or 20 comprises a computer including the processor 101, the main memory 102, the auxiliary storage device 103, and the system transmission path 106 connecting these components.

The processor 101 acts as a main component of the computer. The processor 101 controls each section to perform functions of the POS apparatus 10 or 20 according to an operating system or application programs.

The main memory 102 acts as main memory of the computer. The main memory 102 includes a nonvolatile memory unit and a volatile memory unit. The main memory 102 stores the operating system or application programs in the nonvolatile memory unit. Further, in some cases, the main memory 102 also stores data required by the processor 101 to control each section in the nonvolatile or volatile memory unit. The main memory 102 uses the volatile memory unit as a work area for the processor 101 to rewrite data properly. The work area includes a transaction region. The transaction region is a region in which the sales data of the commodities sold in a commodity transaction and the settlement data of the commodity transaction are stored.

The auxiliary storage device 103 acts as auxiliary memory of the computer. The auxiliary storage device 103 is, for example, an EEPROM (Electric Erasable Programmable Read-OnlyMemory), an HDD (Hard Disk Drive), or an SSD (Solid State Drive). The auxiliary storage device 103 persistently stores the data used by the processor 101 to carry out various processes or the data generated by the process executed by the processor 101. The auxiliary storage device 103 may store the foregoing operating system and application programs as well.

The communication interface 104 is an interface for the data communication with the store server 40 and the support server 50 which are connected via the LAN 70.

The I/O interface 105 is an interface for the data communication among various input/output devices. In the case of the facing-type POS apparatuses 10, the scanner 11, the keyboard 12, the display 13a for operator, the display 13b for customer, and the printer 14 are connected with the I/O interface 105. In the case of the self-service POS apparatus 20, the scanner 21, the touch panel 22, the automatic change dispenser 23, and the printer 24 are connected with the I/O interface 105.

No specific limitations are given to the number of the facing-type POS apparatuses 10 or the self-service POS apparatuses 20 arranged in the retail store 100. A proper number of facing-type POS apparatuses 10 and a proper number of self-service POS apparatuses 20 are arranged in the retail store 100 according to the scale or the internal layout of the retail store 100. Further, the arrangement of both the facing-type POS apparatus 10 and the self-service POS apparatus 20 is not necessary. Instead, only one of the facing-type POS apparatus 10 and the self-service POS apparatus 20 may be arranged at the settlement region 1 for the commodity sales processing system.

The POS ID of each of the POS apparatuses 10 and 20 is stored in the auxiliary storage device 103. The POS ID of each of the POS apparatuses 10 and 20 may also be stored in the main memory 102. The POS ID of each of the POS apparatuses 10 and 20 is fixed and unique. The store server 40 and the support server 50 identify each of the POS apparatuses 10 and 20 connected with the LAN 70 according to the POS ID of the POS apparatus 10 or 20.

Each of the POS apparatuses 10 and 20 is marked with a barcode 7 representing the POS ID thereof. For example, as shown in FIG. 1, in the case of the facing-type POS apparatus 10, a barcode 7 is marked on the side of the POS apparatus 10 opposite to the cashier 3 operating the scanner 11, that is, on the side of the customer 4. In the case of the self-service POS apparatus 20, the barcode 7 is marked on the front side of the housing of the self-service POS apparatus 20 opposite to the customer 4. Further, the position of the barcode 7 shown in FIG. 1 is only an example. No specific limitations are given to the position of the barcode 7. For example, the barcode 7 may be replaced by a two-dimensional data code.

[Store Server]

Figure 4:
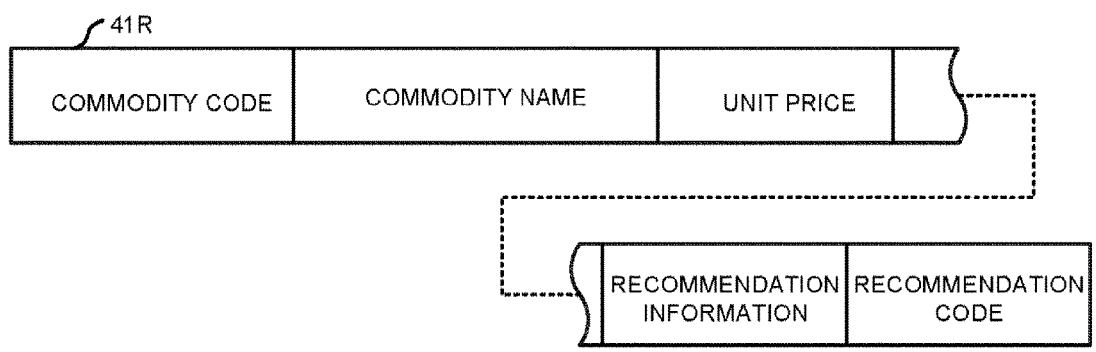
FIG. 4 schematically illustrates a data structure of a commodity data record stored in a commodity database.

As shown in FIG. 2, the store server 40 includes a commodity database 41 and a recommendation database 42. A commodity data record 41R having a data structure shown in FIG. 4 is stored in the commodity database 41 for each commodity purchased in the retail store 100. The commodity data record 41R includes a commodity code, a commodity name, a price, recommendation information, and a recommendation code.

The commodity code of each commodity 5 is fixed and unique. Each commodity 5 has a barcode or QR code representing the commodity code thereof displayed thereon. By reading the barcode with the scanner 11 or 21, the POS apparatus 10 or 20 registers the sales data of the commodity 5 in the transaction region.

The commodity name and the price are those of the commodity 5 determined according to a corresponding commodity code.

The recommendation information is information for introducing the commodity 5 determined according to a corresponding commodity code, as a recommended commodity. For example, information including a commodity name, a price, and a manufacturer is contained in the recommendation information. Information indicating the location of the recommended commodity may also be contained in the recommendation information. An image representing the recommended commodity may also be contained in the recommendation information.

The recommendation code is a code for identifying a group of recommended commodities set for the commodity 5 determined according to a corresponding commodity code. The recommended commodities set for a commodity are not limited to one item. In some cases, commodities made up of a plurality of items are set as recommended commodities. The recommendation code is '0' if there is no recommended commodity. Not limited to '0', the value of the recommendation code when there is no recommended commodity may also be a pre-defined value.

Figure 5:
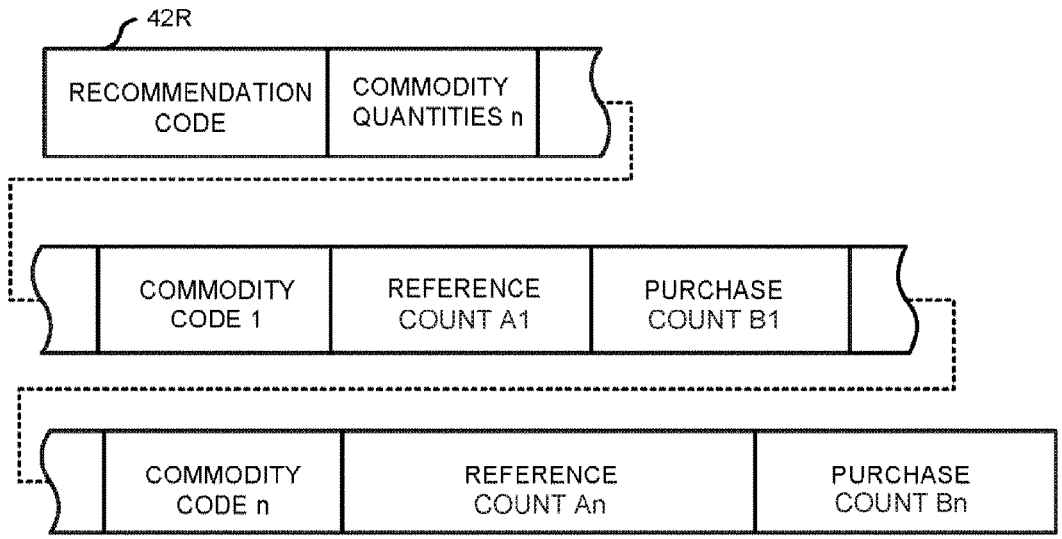
FIG. 5 schematically illustrates a data structure of a recommendation data record stored in a recommendation database.

A recommendation data record 42R having a data structure shown in FIG. 5 is stored in the recommendation database 42 for each recommendation code. The recommendation data record 42R includes a recommendation code, a commodity quantity n and commodity code i corresponding to the commodity quantity n ($1 \le i \le n$), reference count Ai ($1 \le i \le n$), and purchase count Bi ($1 \le i \le n$).

The commodity quantity n is the quantity of the recommended commodities belonging to a corresponding recommendation code. The reference count Ai is the number of times (total times) the customers 4 refer to the recommendation information of a recommended commodity determined according to a corresponding commodity code. The purchase count Bi is the number of times (total times) the customers 4 purchase a recommended commodity determined according to a corresponding commodity code.

The store server 40 collects, through the LAN 70, the sales data of each commodity 5 registered by each of the POS apparatuses 10 or 20. Then, the store server 40 adds the collected sales data up by commodity name, time slot, or the like. Herein, the POS apparatus 10 or 20 and the store server 40 constitute a well-known POS system.

[Relay Device]

The relay device 30 conforms to, for example, a wireless communication standard such as Wi-Fi (Wireless Fidelity). One or more of the relay devices 30 are located in the retail store so that the wireless communication region of the relay devices 30 substantially covers the whole region of the sales floor 6 and the settlement region 1 in the retail store 100. The one or more portable information terminals 400 located in the wireless communication region of the relay devices 30 communicate wirelessly with one of the relay devices 30 to send or receive data through wireless communication. No specific limitations are given to the number of the relay devices 30. A proper number of relay devices 30 may be arranged in the retail store 100 according to the scale or the internal layout of the retail store 100.

[Portable Information Terminal]

Figure 6:
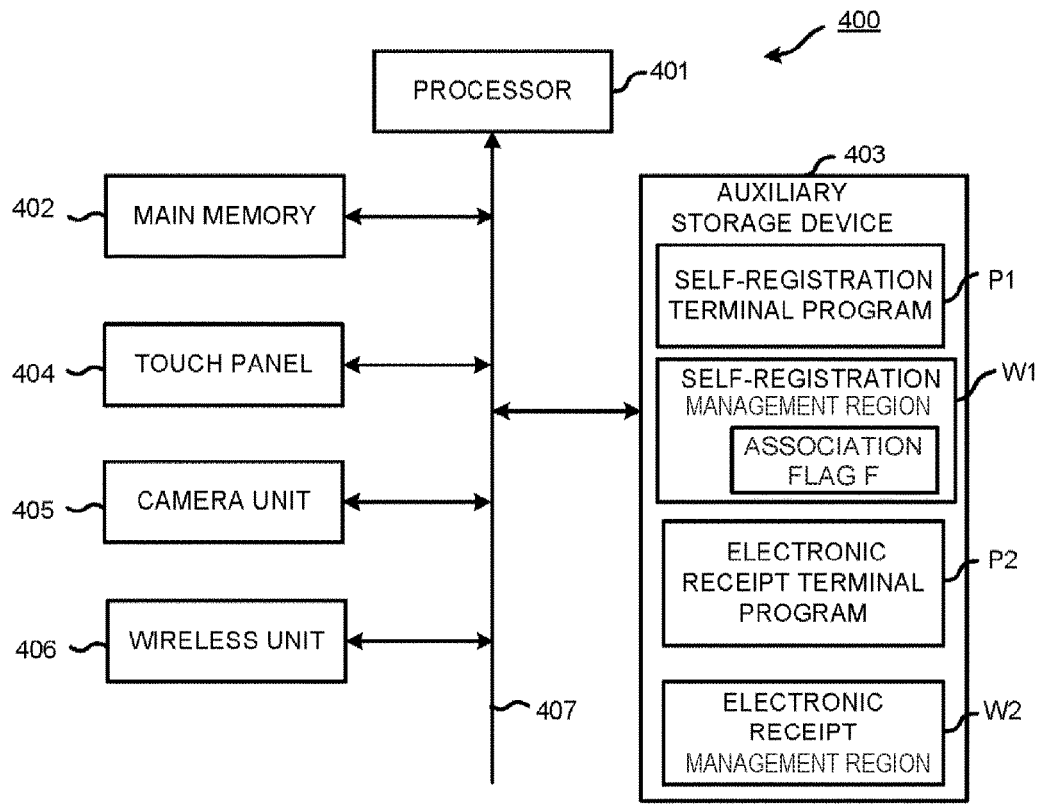
FIG. 6 is a block diagram of a portable information terminal in the commodity sales processing system.

FIG. 6 is a block diagram of the portable information terminal 400. The portable information terminal 400 includes a processor 401, a main memory 402, an auxiliary storage device 403, a touch panel 404, a camera unit 405, and a wireless unit 406. The processor 401 is connected with the main memory 402, the auxiliary storage device 403, the touch panel 404, the camera unit 405, and the wireless unit 406 by a system transmission path 407 including an address bus line, a data bus line, a control signal line, and the like.

The portable information terminal 400 comprises a computer including the processor 401, the main memory 402, the auxiliary storage device 403 and the system transmission path 407 connecting these components.

The processor 401 acts as a main component of the computer. The processor 401 controls each section to perform the functions of the portable information terminal 400 according to an operating system or application programs.

The main memory 402 acts as main memory of the computer. The main memory 402 includes a nonvolatile memory unit and a volatile memory unit. The main memory 402 stores the operating system or application programs in the nonvolatile memory unit. Further, in some cases, the main memory 402 also stores the data required by the processor 401 to control each section in the nonvolatile or volatile memory unit. The main memory 402 uses the volatile memory unit as a work area for the processor 401 to rewrite data properly.

The auxiliary storage device 403 acts as auxiliary memory of the computer. The auxiliary storage device 403 is, for example, an EEPROM. An HDD or SSD may also be used as the auxiliary storage device 403. The auxiliary storage device 403 persistently stores the data used by the processor 401 to carry out various processes or the data generated by the process carried out by the processor 401. The auxiliary storage device 403 may store the foregoing operating system and application programs as well.

The touch panel 404 functions as an input device and a display device of the portable information terminal 400. Icons for starting the foregoing application programs may be displayed on the touch panel 404.

The resolution of the camera unit 405 is sufficient for recognizing a barcode. The wireless unit 406 sends data to or receives data from the relay device 30 through wireless communication. For example, among information processing apparatuses such as smart phones, mobile phones, and tablet terminals, an information processing apparatus having the camera unit 405 and the wireless unit 406 is used as the portable information terminal 400.

By executing a self-registration terminal program P1, the portable information terminal 400 with the foregoing structure functions as an information terminal corresponding to a self-service commodity data input system (hereinafter referred to as a self-scanning system). Such an information terminal can perform the registration process in place of the POS apparatus 10 or 20 by enabling the customer 4 to operate the information terminal to register the data of commodity to be purchased. The settlement of the commodity purchase is executed by the POS apparatus 10 or 20 in the conventional way.

When the processor 401 executes the self-registration terminal program P1, the portable information terminal 400 functions as an information terminal corresponding to the self-scanning system. The self-registration terminal program P1 is stored in the auxiliary storage device 403. Further, a self-registration management region W1 is formed in the auxiliary storage device 403 of the portable information terminal 400.

By executing an electronic receipt terminal program P2, the portable information terminal 400 functions as an information terminal corresponding to an electronic receipt system. The electronic receipt system is a system which formats the information (receipt data) of a receipt generated by each of POS apparatuses 10 and 20, stores the electronic receipt information in the electronic receipt server 80, such that the receipt data can be retrieved by the information processing apparatus 210 via the network 200.

When the processor 401 executes the electronic receipt terminal program P2, the portable information terminal 400 functions as an information terminal corresponding to the electronic receipt system. The electronic receipt terminal program P2 is stored in the auxiliary storage device 403. Further, an electronic receipt management region W2 is formed in the auxiliary storage device 403 of the portable information terminal 400.

[Support Server (Commodity Sales Input Support Apparatus)]

Figure 7:
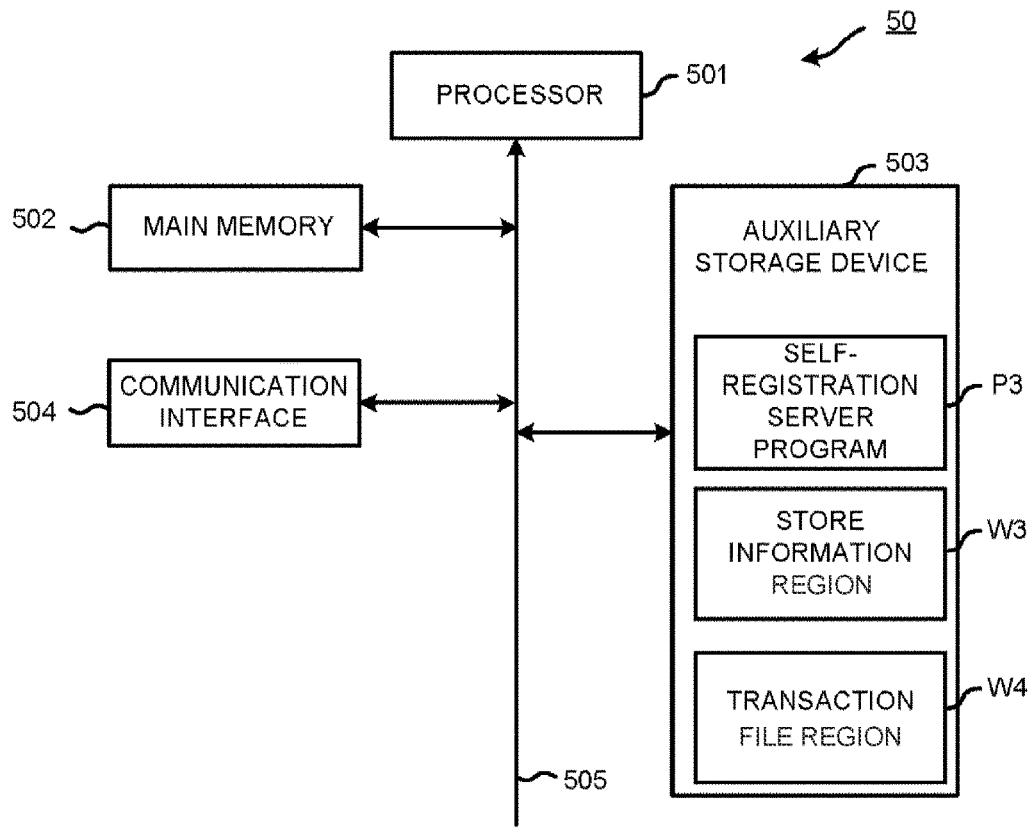
FIG. 7 is a block diagram of a support server in the commodity sales processing system.

FIG. 7 is a block diagram of the support server 50. The support server 50 includes a processor 501, a main memory 502, an auxiliary storage device 503, and a communication interface 504. The processor 501 is connected with the main memory 502, the auxiliary storage device 503, and the communication interface 504 by a system transmission path 505 including an address bus line, a data bus line, a control signal line, and the like.

The support server 50 comprises a computer having the processor 501, the main memory 502, the auxiliary storage device 503, and the system transmission path 505 connecting these components.

The processor 501 acts as a main component of the computer. The processor 501 controls each section to perform the functions of the support server 50 according to an operating system or application programs.

The main memory 502 acts as main memory of the computer. The main memory 502 includes a nonvolatile memory unit and a volatile memory unit. The main memory 502 stores the operating system or application programs in the nonvolatile memory unit. Further, in some cases, the main memory 502 also stores the data required by the processor 501 to carry out a process for controlling each section in the nonvolatile or volatile memory unit. The main memory 502 uses the volatile memory unit as a work area for the processor 501 to rewrite data properly.

The auxiliary storage device 503 acts as auxiliary memory of the computer. The auxiliary storage device 503 is, for example, an EEPROM, an HDD, or an SSD. The auxiliary storage device 503 persistently stores the data used by the processor 501 to carry out various processes or the data generated by the process carried out by the processor 501. The auxiliary storage device 503 may store the foregoing operating system and application programs as well.

The communication interface 504 is an interface for the data communication with the store server 40 and each of POS apparatuses 10 or 20 which are connected via the LAN 70.

The support server 50 having such a structure functions as a commodity data input support server that supports input of the commodity data relating to a self-registration process, and has a self-registration server program P3 in the auxiliary storage device 503. Further, the support server 50 forms a store information region W3 and a transaction file region W4 in the auxiliary storage device 503.

The self-registration server program P3 stays in the support server 50. Through the support server 50 executing the self-registration server program P3 in cooperation with the portable information terminal 400 executing the self-registration terminal program P1, the self-service commodity registration can executed by the customer 4.

The store information region W3 is a region for storing information relating to the retail store (seller) 100 in which the support server 50 is arranged, for example, seller information such as a store name and the like.

Figure 8:
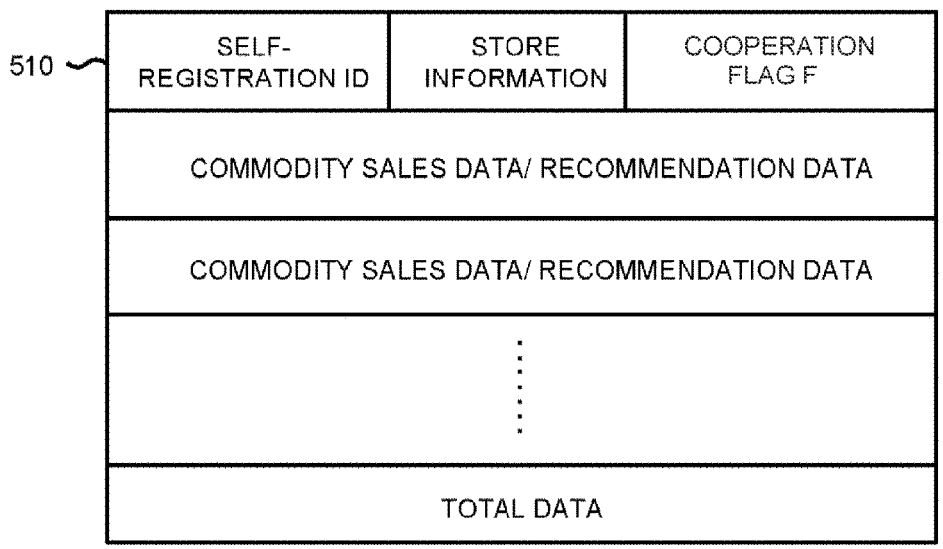
FIG. 8 schematically illustrates a data structure of a commodity transaction file.

The transaction file region W4 is a region for storing a commodity transaction file 510 having a data structure shown in FIG. 8. The commodity transaction file 510 is formed for each customer 4 executing a self-registration process. A plurality of commodity transaction files 510 corresponding to a plurality of customers 4 can be stored in the transaction file region W4 simultaneously.

The data stored in the commodity transaction file 510 consists of a self-registration ID, store information, an association flag F, commodity sales data, recommendation data, and the total of the commodities purchased by the customer 4.

The self-registration ID (first ID) is a unique code for identifying a customer 4 who performs a self-registration process. That is, the self-registration ID (first ID) is an ID of the user of the portable information terminal 400. A self-registration ID is set for each customer 4 each customer 4 installs the self-registration terminal program P1 in the portable information terminal 400. The self-registration ID is used as an authentication ID for the customer 4 to log into the support server 50 from the portable information terminal 400. If the customer 4 logs into the support server 50, the self-registration ID is stored in the self-registration management region W1 of the portable information terminal 400. Each customer 4 is assigned with an optional unique self-registration ID.

The association flag F is 1-bit data indicating whether or not the self-scanning system is associated with the electronic receipt system. A customer 4 who installs the self-registration terminal program P1 and the electronic receipt terminal program P2 in the portable information terminal 400 can make the self-scanning system become associated with the electronic receipt system. That is, the customer 4 can download details of the transaction for the commodities self-registered by the customer 4 to the portable information terminal 400 as an electronic receipt and view the details of the commodity transaction. Whether or not the self-scanning system is associated with the electronic receipt system can be optionally set by the customer 4. If the association of the self-scanning system with the electronic receipt system is set, then an association flag F is set in the self-registration management region W1 of the portable information terminal 400, as shown in FIG. 6. If the association is not set, then the association flag F is not set therein. The customer 4 can change the setting of the association flag F by operating the portable information terminal 400.

The commodity sales data and recommendation data are generated according to a commodity code input through a self-registration operation. The commodity sales data includes a commodity code, a commodity name, a price, sales quantities, and a sales amount. The recommendation data includes a recommendation code, a commodity quantity n and commodity code i corresponding to the commodity quantity n (1≤i≤n), reference count Ai (1≤i≤n), and purchase count Bi (1≤i≤n).

When a recommendation code is set with respect to a commodity code input through a self-registration operation, the recommendation data associated with the recommendation code thereof and stored in the recommendation database 42 is added to the commodity sales data generated according to the commodity code. No recommendation data is added to the commodity sales data if no recommendation code is set with respect to the commodity code.

The combination of the support server 50 with the portable information terminal 400 serve as the commodity data input system. The support server 50 provides the portable information terminal 400 with the information of a recommended commodity relating to the commodity 5 that the customer 4 wants to purchase. Further, the support server 50 processes information (reference count Ai and purchase count Bi) for mastering a promotion effect caused by the recommendation information according to an input from the portable information terminal 400 providing the recommendation information.

Further, the support server 50 can use, for example, a conventional server or computer as its basic hardware. The support server 50 may not initially contain the self-registration server program P3 in the auxiliary storage device 503 thereof, and the self-registration server program P3 may be installed later. In this case, the self-registration server program P3 is delivered by being recorded in a removable recording medium such as a magnetic disc, a magneto-optical disc, an optical disc, or a semiconductor memory, or by being downloaded through a network. Moreover, in this case, the self-registration server program P3 is written into the auxiliary storage device 503 through an operation of the user.

[Electronic Receipt Server]

Figure 9:
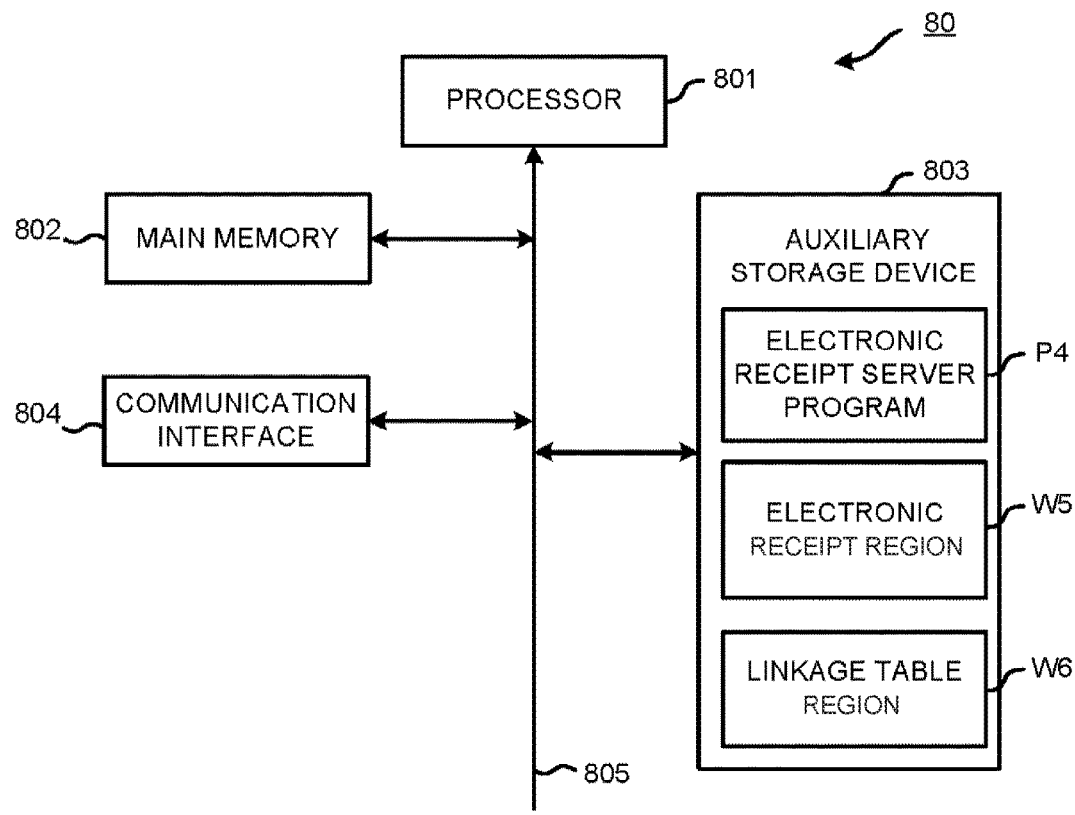
FIG. 9 is a block diagram of an electronic receipt server in the commodity sales processing system.

FIG. 9 is a block diagram of the electronic receipt server 80. The electronic receipt server 80 includes a processor 801, a main memory 802, an auxiliary storage device 803, and a communication interface 804. The processor 801 is connected with the main memory 802, the auxiliary storage device 803, and the communication interface 804 via a system transmission path 805 including an address bus line, a data bus line, a control signal line, and the like.

The electronic receipt server 80 comprises a computer having the processor 801, the main memory 802, the auxiliary storage device 803, and a system transmission path 805 connecting these components.

The processor 801 acts as a main component of the computer. The processor 801 controls each section to perform the functions of the electronic receipt server 80 according to an operating system or application programs.

The main memory 802 acts as main memory of the computer. The main memory 802 includes a nonvolatile memory unit and a volatile memory unit. The main memory 802 stores the operating system or application programs in the nonvolatile memory unit. Further, in some cases, the main memory 802 may also store the data required by the processor 801 to control each section in the nonvolatile or volatile memory unit. The main memory 802 uses the volatile memory unit as a work area for the processor 801 to rewrite data properly.

The auxiliary storage device 803 acts as auxiliary memory of the computer. The auxiliary storage device 803 is, for example, an EEPROM, an HDD, or an SSD. The auxiliary storage device 803 persistently stores the data used by the processor 801 to carry out various processes or the data generated by the process carried out by the processor 801. The auxiliary storage device 803 may store the foregoing operating system and application programs as well.

The communication interface 804 is an interface for the data communication with the store server 40 and the information processing apparatus 210 which are connected via the network 200.

The electronic receipt server 80 having such a structure contains an electronic receipt server program P4 in the auxiliary storage device 803. Further, the electronic receipt server 80 has an electronic receipt region W5 and a linkage table region W6 in the auxiliary storage device 803.

The electronic receipt server program P4 is stored in the electronic receipt server 80. Through execution of the electronic receipt server program P4 by the electronic receipt server 80 and the electronic receipt terminal program P2, the portable information terminal 400 can display an electronic receipt thereon.

Figure 10:
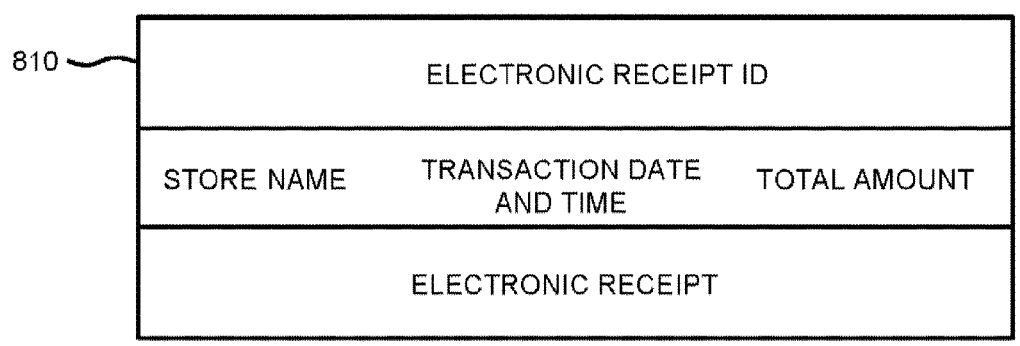
FIG. 10 schematically illustrates a data structure of an electronic receipt file.

The electronic receipt region W5 is a region for storing an electronic receipt file 810 having a data structure shown in FIG. 10. The electronic receipt file 810 is formed for each commodity transaction for which an electronic receipt is generated. A plurality of electronic receipt files 810 corresponding to a plurality of commodity transactions can be stored in the electronic receipt region W5 simultaneously.

The data in the electronic receipt file 810 consists of an electronic receipt ID, the simplified data of an electronic receipt consisting of a store name, a transaction date and time and a total amount, and the actual data of the electronic receipt. Further, the simplified data are not limited to the combination of a store name, a transaction date and time, and a total amount. For example, the simplified data may be a combination of a store name and a transaction date and time, or combination of a transaction date and time, and a total amount. Further, other items other than a store name, a transaction date and time, and a total amount may also be contained in the simplified data.

The electronic receipt ID (second ID) is a unique code for identifying the customer 4 using the electronic receipt system. To use the electronic receipt system, a customer 4 completes the member registration with respect to a system manager in advance. The customer 4 who completed the member registration receives a fixed electronic receipt ID assigned by the system manager. The electronic receipt ID is used as an authentication ID for the customer 4 to log in the electronic receipt server 80 from the portable information terminal 400. After the customer 4 logs in the electronic receipt server 80, the electronic receipt ID is stored in the electronic receipt management region W2 of the portable information terminal 400. Each customer 4 who completed the member registration receives a unique electronic receipt ID. That is, the electronic receipt ID (second ID) is an ID used by the customer to receive an electronic receipt.

Figure 11:
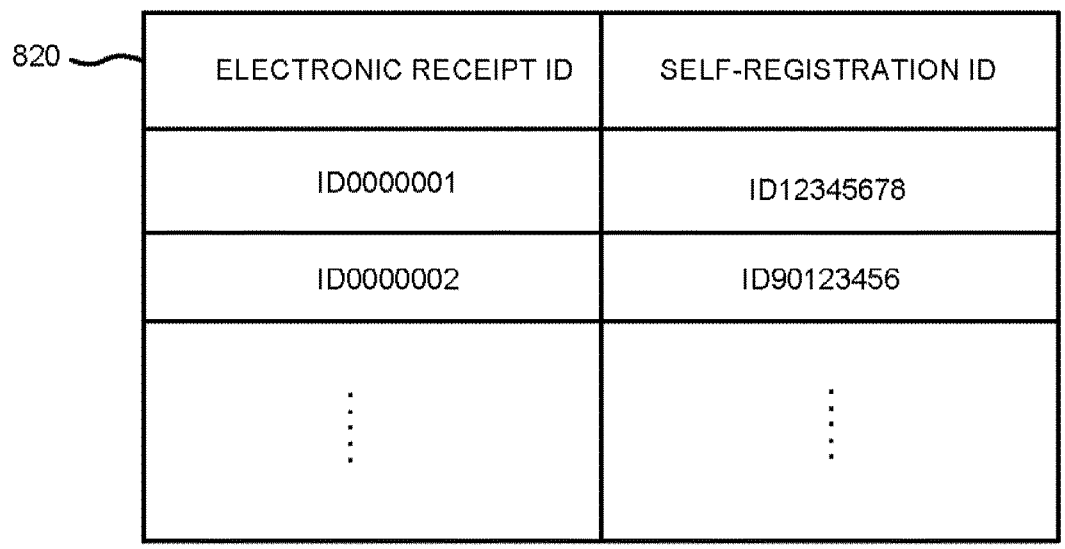
FIG. 11 schematically illustrates a data structure of a linkage table.

The linkage table region W6 is a region for storing a linkage table 820 having a data structure shown in FIG. 11. The linkage table 820 stores the electronic receipt ID of the customer 4 who sets the association of the self-scanning system with the electronic receipt system in association with a self-registration ID. That is, when the customer 4 sets the association of the self-scanning system with the electronic receipt system, the electronic receipt ID of the customer 4 is stored in the linkage table 820 in association with a self-registration ID.

Here, the electronic receipt server 80 can be set up using, for example, a conventional server or computer as the basic hardware thereof. The electronic receipt server 80 may not initially contain the electronic receipt server program P4 in the auxiliary storage device 803, and the electronic receipt server program P4 may be installed later. In this case, the electronic receipt server program P4 is recorded in a removable recording medium such as a magnetic disc, a magneto-optical disc, an optical disc, or a semiconductor memory, or by being downloaded through a network. Moreover, in this case, the electronic receipt server program P4 is written into the auxiliary storage device 803 through an operation of the user.

[Operation of Commodity Sales Processing System]

Figure 12:
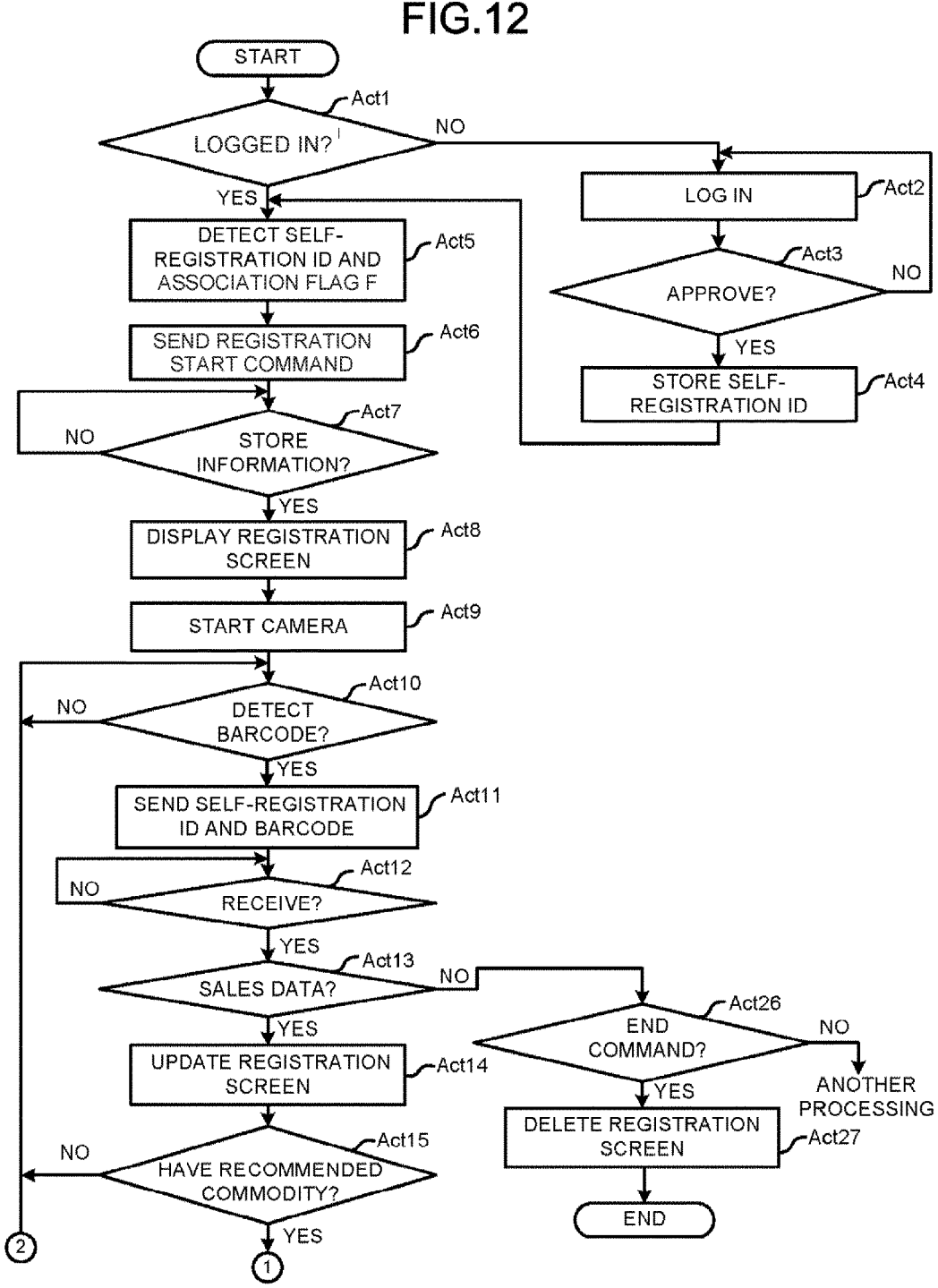
FIG. 12 is a flowchart illustrating procedures of a process carried out by a processor of the portable information terminal according to a self-registration terminal program.
Figure 13:
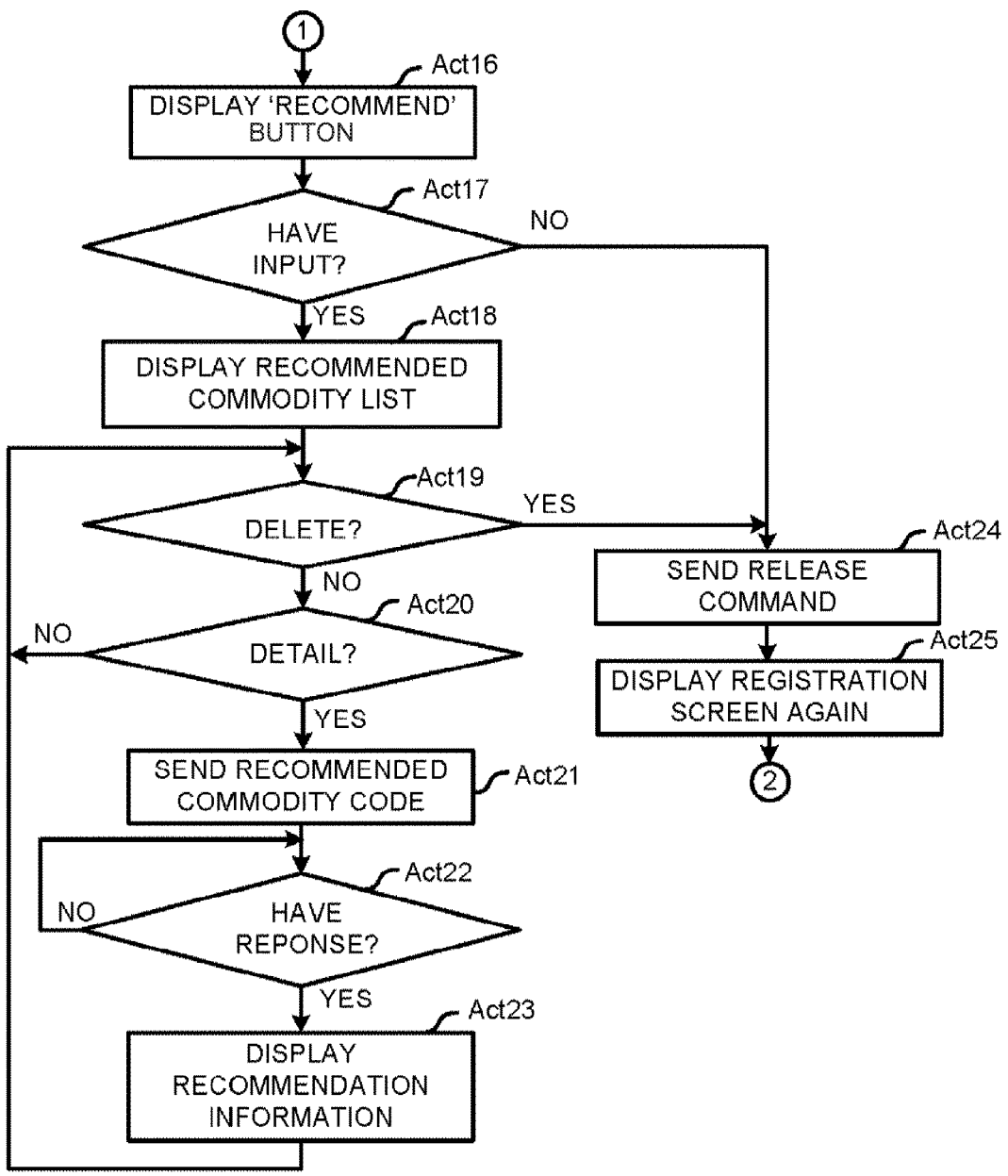
FIG. 13 is a flowchart illustrating procedures of a process carried out by the processor of the portable information terminal according to a self-registration terminal program.
Figure 14:
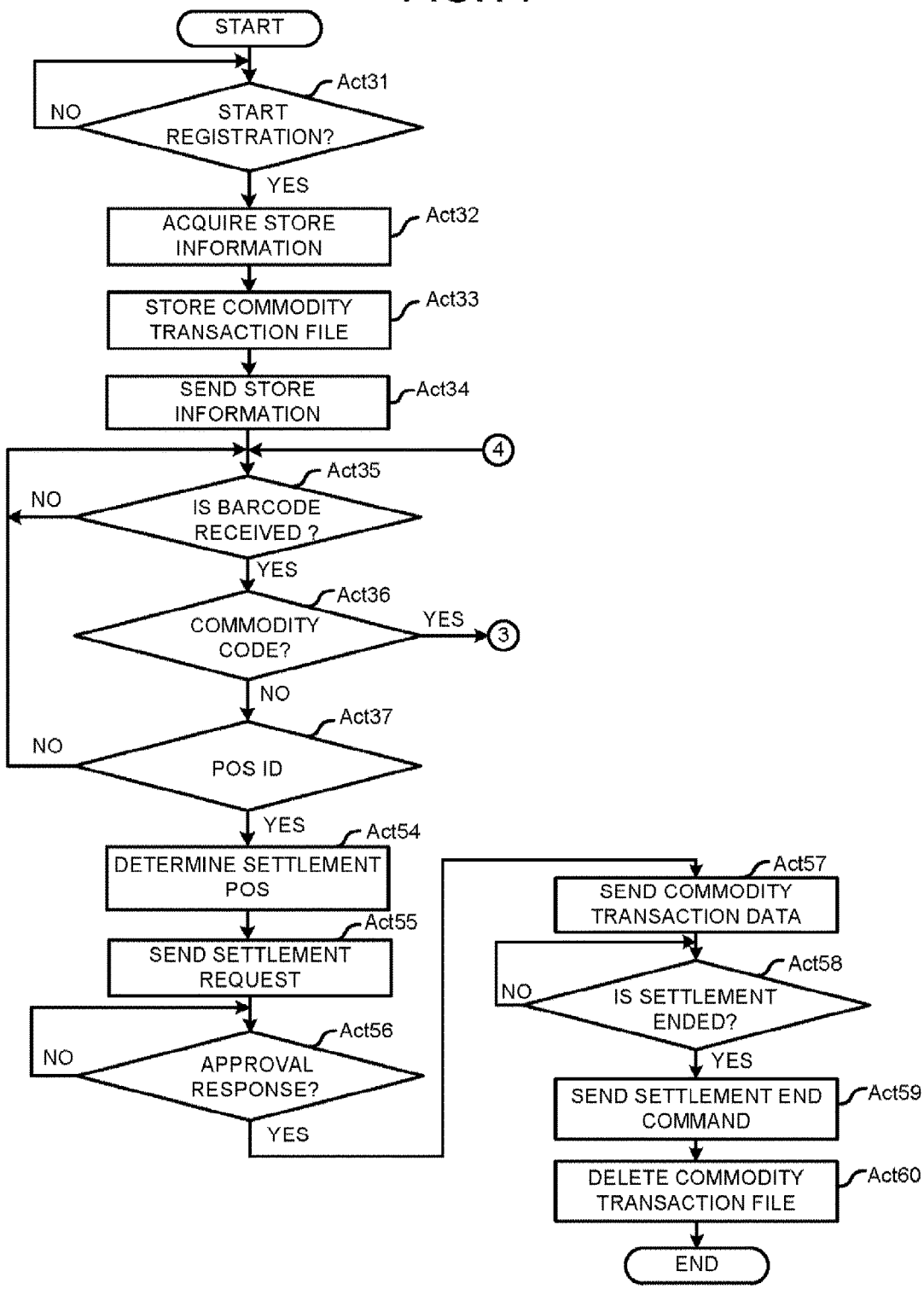
FIG. 14 is a flowchart illustrating procedures of a process carried out by a processor of the support server according to a self-registration server program.
Figure 15:
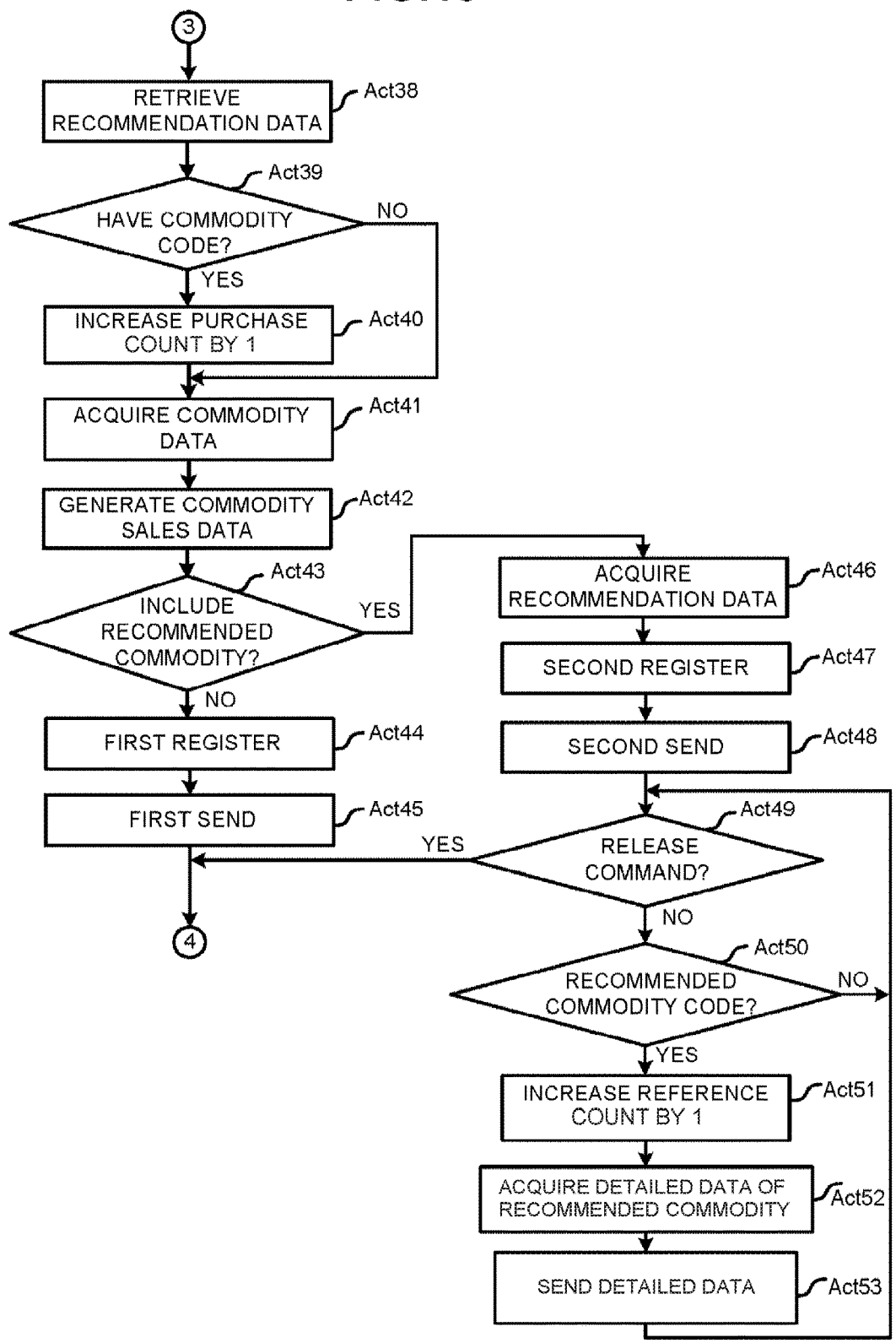
FIG. 15 is a flowchart illustrating procedures of a process carried out by a processor of the support server according to a self-registration server program.
Figure 16:
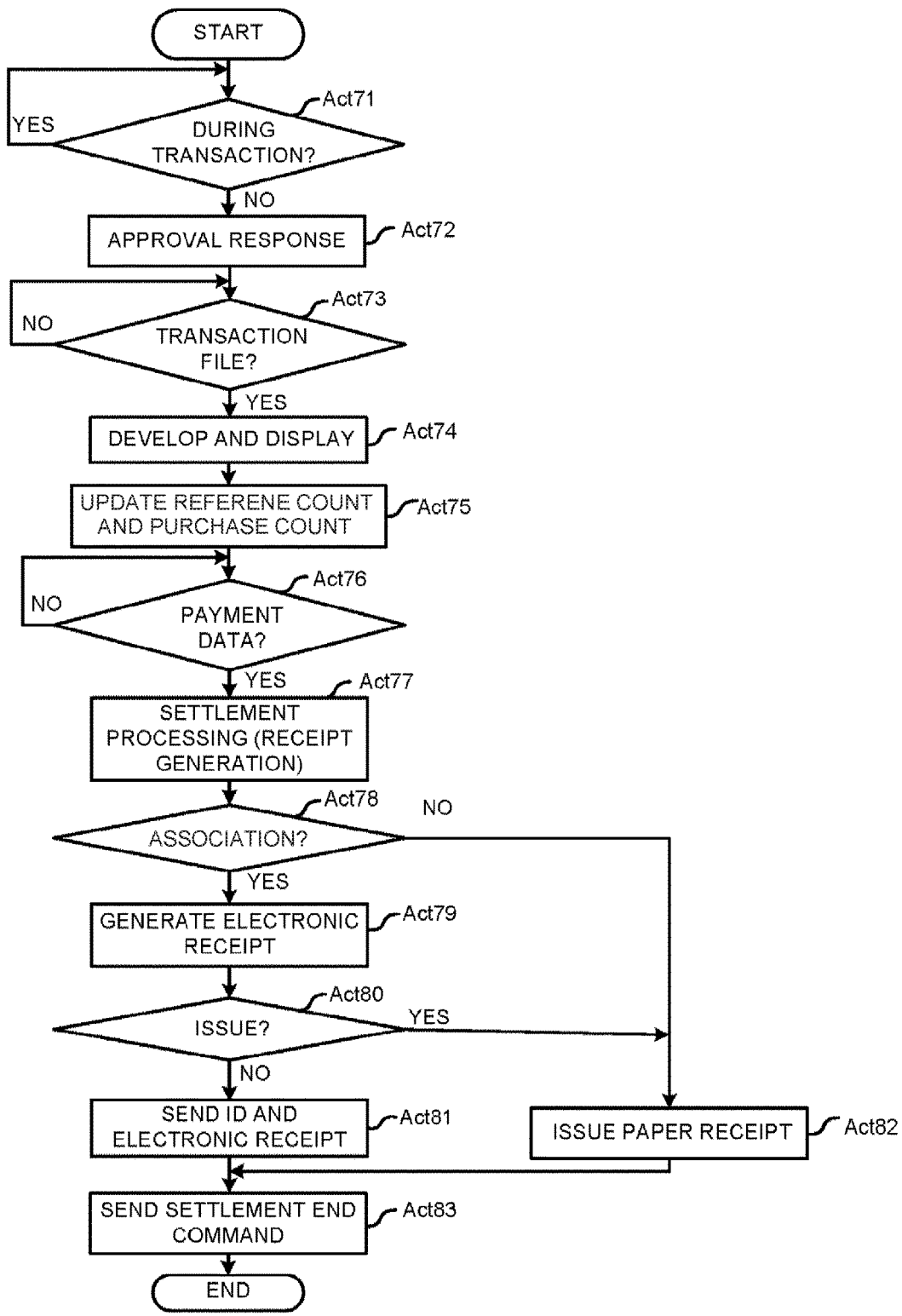
FIG. 16 is a flowchart illustrating procedures of a process carried out by a processor of the POS apparatus when the POS apparatus receives a settlement request command according to a control program.
Figure 19:
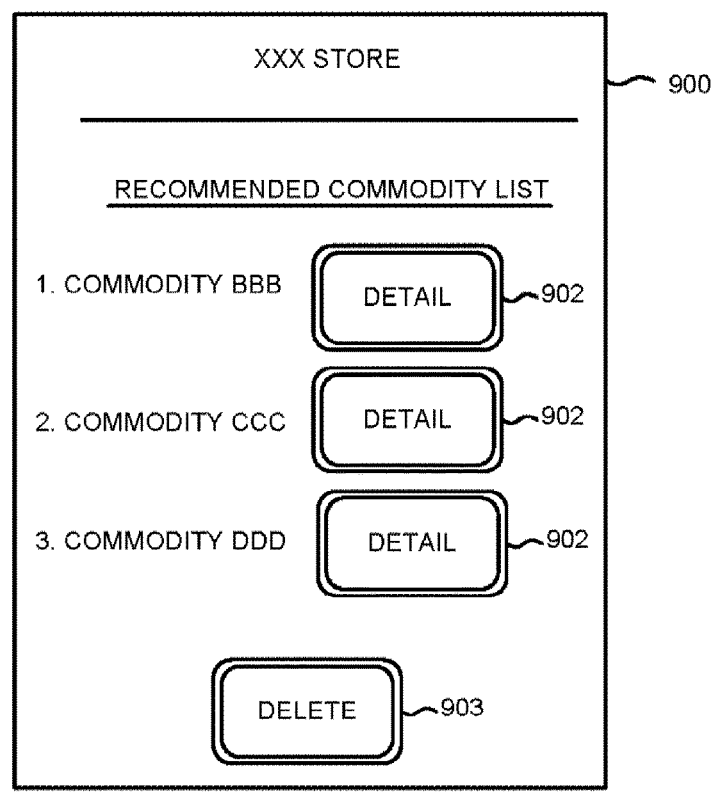
FIG. 19 schematically illustrates a recommended commodity list displayed on a registration screen of the portable information terminal.

Next, operations of the commodity sales processing system are described with reference to flowcharts of FIG. 12-FIG. 17. FIG. 12 and FIG. 13 are flowcharts illustrating main procedures of a process carried out by the processor 401 of the portable information terminal 400 according to the self-registration terminal program P1. FIG. 14 and FIG. 15 are flowcharts illustrating main procedures of a process carried out by the processor 501 of the support server 50 according to the self-registration server program. P3. FIG. 16 is a flowchart illustrating main procedures of a process carried out by the processor 101 of the POS apparatus 10 or 20 when the POS apparatus receives the settlement request command (described below) according to a control program. FIG. 19 is a flowchart illustrating main procedures of a process carried out by the processor 801 of the electronic receipt server 80 according to the electronic receipt server program P4. Here, the content of each process described below with reference to FIG. 12-FIG. 17 is merely an example, and various other processes that can achieve the same effect can be properly performed.

Before shopping in the retail store 100, the customer 4 operates the touch panel 404 of the portable information terminal 400 to start the self-registration terminal program P1. That is, the customer 4 selects the icon to launch the self-registration terminal program P1, displayed on the touch panel 404. If the self-registration terminal program P1 is started, then the processor 401 of the portable information terminal 400 starts the process shown in FIG. 12.

First, the processor 401 determines whether or not a customer has logged into the support server 50 (Act 1). If the self-registration terminal program P1, after being launched, is ended without being logged out, the login state of the customer is maintained. A self-registration ID serving as an authentication ID is stored in the self-registration management region W1 during the login state.

If the customer has not logged in the support server 50 (No in Act 1), the processor 401 displays a login screen on the touch panel 404 (Act 2). A customer 4 logs in by inputting the own self-registration ID on the login screen. The customer 4 may input a self-registration ID and a password.

When the customer logs in, the processor 401 wirelessly sends login information containing the self-registration ID. The login information is received by the relay device 30 and transmitted therefrom to the support server 50 via the LAN 70. The support server 50 authenticates the login operation. Then, the support server 50 notifies the portable information terminal 400 of the result of the authentication through a route inverse to that for login information.

The processor 401 determines whether or not the login is approved (Act 3). If it is determined that the login is not approved (No in Act 3), the processor 401 may perform a login operation again (Act 2). If it is determined that the login is approved (Yes in Act 3), the processor 401 stores the self-registration ID used for the login operation in the self-registration management region W1 (Act 4).

If the login is approved and the self-registration ID is stored in the self-registration management region W1 or the self-registration ID is stored in the self-registration management region W1 while the customer is logged in (Yes in Act 1), the processor 401 extracts the self-registration ID from the self-registration management region W1. Further, the processor 401 extracts an association flag F in the self-registration management region W1 (Act 5). The association flag F is set as '1' if the user sets the association of the self-scanning system with the electronic receipt system. The association flag F is set as '0' if the association of the self-scanning system with the electronic receipt system is not set.

The processor 401 wirelessly sends a registration start command containing the self-registration ID and the association flag F extracted from the self-registration management region W1 (Act 6). The registration start command instructs the support server 50 to start a self-registration process using the portable information terminal 400. The registration start command wirelessly sent from the wireless unit 406 is received by the relay device 30 and transferred therefrom to the support server 50 via the LAN 70.

As shown in FIG. 14, the processor 501 of the support server 50 in which the self-registration server program P3 runs, waits to receive the registration start command (Act 31). If the processor 501 receives the registration start command sent from the portable information terminal 400, the processor 501 acquires store information from the store information region W3 of the auxiliary storage device 503 (Act 32). Moreover, the processor 501 generates a commodity transaction file 510 in the transaction file region W4. Then, the processor 501 stores the self-registration ID and the association flag F that are contained in the registration start command and the store information acquired from the store information region W3 in the commodity transaction file 510 (Act 33).

The processor 501 sends the store information to the portable information terminal 400 from where the registration start command is originally sent (Act 34). The store information is wirelessly sent by the relay device 30 and received by the wireless unit 406 of the portable information terminal 400 that has sent the registration start command. Further, not limited to the foregoing sequence, Act 32 and Act 33 may be executed in a reverse sequence. Further, not limited to the foregoing sequence, Act 33 and Act 34 may be executed in a reverse sequence.

As shown in FIG. 12, the processor 401 of the portable information terminal 400 which has sent the registration start command waits to receive the store information (Act 7). If the wireless unit 406 receives the store information (Yes in Act 7), the processor 401 displays a registration screen on the touch panel 404 (Act 8). Further, the processor 401 drives the camera unit 405 (Act 9). Here, not limited to foregoing sequence, Act 8 and Act 9 may be executed in a reverse sequence.

The registration screen displays, for example, the store information. Detail columns are displayed on the registration screen to display a commodity name, a price, a total amount, and the like. A message for urging the customer 4 to carry out a self-registration operation may also be displayed on the registration screen. The customer 4 who viewed the registration screen starts shopping on the sales floor 6. Then, the customer 4 photographs the barcode affixed on a commodity 5 that the customer 4 wants to purchase using the camera unit 405. The photographed commodity 5 is placed in a shopping cart.

The processor 401 of the portable information terminal 400 waits until a barcode is detected from the image captured by the camera unit 405 (Act 10). If the barcode is detected (Yes in Act 10), the processor 401 adds the self-registration ID stored in the self-registration management region W1 to the data of the barcode and wirelessly sends the processed barcode data (Act 11). The barcode data containing the self-registration ID sent from the wireless unit 406 is received by the relay device 30 and transmitted therefrom to the support server 50 via the LAN 70.

As shown in FIG. 14, the processor 501 of the support server 50 which has sent the store information to the portable information terminal 400 waits to receive the barcode data sent from the portable information terminal 400 (Act 35). If the processor 501 receives the barcode data containing the self-registration ID (Yes in Act 35), the processor 501 determines whether the barcode data is a commodity code (Act 36) or a POS ID (Act 37). A barcode 7 representing a POS ID is different in the code system from a barcode representing a commodity ID. The processor 501 determines the type of the barcode according to the difference of the code system.

If the barcode data is a commodity code (Yes in Act 36), the processor 501 detects the self-registration ID added to the barcode data. Then, as shown in FIG. 15, the processor 501 retrieves recommendation data in the commodity transaction file 510 in which the self-registration ID is stored (Act 38). Furthermore, the processor 501 confirms whether or not a commodity code represented by the barcode data is contained in the recommendation data (Act 39).

If a commodity code represented by the barcode data is contained in the recommendation data (Yes in Act 39), the processor 501 increases the purchase count Bi corresponding to the commodity code by 1 (Act 40). Here, if a plurality of commodity codes represented by barcode data is contained in the recommendation data (Yes in Act 39), the processor 501 separately increases each purchase count Bi corresponding to one of the commodity codes by 1. If no commodity code represented by barcode data is contained in the recommendation data (No in Act 39), the processor 501 does not execute the process in Act 40. It is possible that no recommendation data is stored in the commodity transaction file 510. For example, no recommendation data is stored in the commodity transaction file 510 in the stage where the customer 4 photographs the barcode of an item using the camera unit 405. In this case, the processor 501 does not execute the process in Acts 39 and 40.

Here, the processor 501, by referring to the commodity transaction file 510, function as a counting section which counts up if a commodity determined according to a commodity code input from the portable information terminal 400 is a recommended commodity stored in the commodity transaction file 510.

The processor 501 accesses the store server 40 using the commodity code represented by barcode data. Then, the processor 501 acquires, from the commodity database 41, the commodity data (e.g. a commodity name, a price, and a recommendation code) associated with the commodity code (Act 41). The processor 501 generates commodity sales data containing a commodity code, a commodity name, a price, sales quantities, a sales amount, and the like (Act 42) according to the commodity data if the processor 501 acquires the commodity data.

The processor 501 checks the recommendation code contained in the commodity data (Act 43). If the recommendation code is a code indicating that there is no recommended commodity (No in Act 43), the processor 501 searches the transaction file region W4 using the self-registration ID to the barcode data. Then, the processor 501 registers the commodity sales data in the commodity transaction file 510 containing the self-registration ID (Act 44). Further, the processor 501 sends the commodity sales data to the portable information terminal 400 from where the barcode data is originally sent (Act 45). The commodity sales data is wirelessly sent from the relay device 30 and received by the wireless unit 406 of the portable information terminal 400 sending the barcode data. Further, not limited to the foregoing sequence, Act 44 and Act 45 may be executed in a reverse sequence.

Here, the processor 501 and the transaction file region W4 of the auxiliary storage device 503 function as a sales data storage section which stores the data of a purchased commodity determined according to a commodity code input from the portable information terminal 400.

The processor 501 completing the process in Act 44 and Act 45 waits for new barcode data from the portable information terminal 400 (Act 35).

On the other hand, if the recommendation code is a code indicating that there is a recommended commodity (Yes in Act 43), the processor 501 accesses the store server 40 using the recommendation code. Then, the processor 501 acquires, from the recommendation database 42, recommendation data (a commodity quantity n and commodity code i corresponding to the commodity quantity n ($1 \leq i \leq n$), reference count Ai ($1 \leq i \leq n$), and purchase count Bi ($1 \leq i \leq n$)) associated with the recommendation code (Act 46).

The processor 501 searches the transaction file region W4 using the self-registration ID to the barcode data. Then, the processor 501 registers the commodity sales data and the recommendation data in the commodity transaction file 510 in which the self-registration ID is stored. At this time, the processor 501 resets both of the reference count Ai ($1 \leq i \leq n$) and the purchase count Bi ($1 \leq i \leq n$) of recommendation data as '0' (Act 47).

Here, the processor 501 and the transaction file region W4 of the auxiliary storage device 503 function as a related data storage section which stores data of a recommended commodity, that is, a related commodity relating to the purchased commodity determined according to the commodity code input from the portable information terminal 400.

The processor 501 sends, via the communication interface 504, a pair of the commodity sales data and the recommendation data registered in the commodity transaction file 510 to the portable information terminal 400 from which the barcode data are originally sent (Act 48). The pair is wirelessly sent from the relay device 30 and received by the wireless unit 406 of the portable information terminal 400 sending the barcode data. Further, not limited to the foregoing sequence, Act 47 and Act 48 may be executed in a reverse sequence.

Here, the processor 501 cooperates with the communication interface 504 to function as a related data sending section which sends the data of a recommended commodity to the portable information terminal 400 if the recommended commodity is associated with the purchased commodity determined according to the commodity code input from the portable information terminal 400.

As shown in FIG. 12, the processor 401 of the portable information terminal 400 which has sent the barcode data waits for the sending of data from the support server 50 (Act 12). After receiving data from the support server 50 (Yes in Act 12), the processor 401 determines whether or not the data are commodity sales data or the pair of commodity sales data and recommendation data (Act 13). After determining that the data are commodity sales data or the pair (Yes in Act 13), the processor 401 displays the commodity name, the price, and the like contained in the commodity sales data in detail columns of the registration screen (Act 14).

The processor 401 determines whether or not the data received are a pair of commodity sales data and recommendation data (Act 15). If the data received are not a pair (No in Act 15), the processor 401 waits for detection of a new barcode from an image captured by the camera unit 405 (Act 10).

If the data received are a pair (Yes in Act 15), the processor 401 displays a 'recommended commodity' button 901 on the registration screen, as shown in FIG. 13 (Act 16). Then, the processor 401 determines whether or not the 'recommended commodity' button 901 is selected (Act 17).

Figure 18:
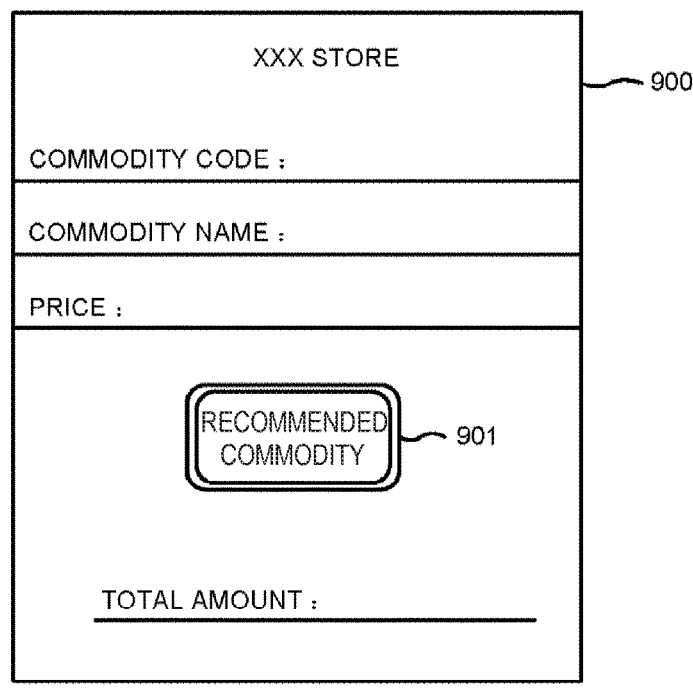
FIG. 18 schematically illustrates a 'recommended commodity' button displayed on a registration screen of the portable information terminal.

FIG. 18 illustrates a 'recommended commodity' button 901. The 'recommended commodity' button 901 is displayed on a registration screen 900 if a recommended commodity is set for the commodity 5 that the customer 4 desires to purchase. The customer 4 recognizing the 'recommended commodity' button 901 decides whether or not to view information of the recommended commodity. When the customer 4 decides to view the information of the recommended commodity, the customer 4 may select the 'recommended commodity' button 901. When the customer 4 decides not to view the information of the recommended commodity, the customer 4 touches another position rather than selecting the 'recommended commodity' button 901. Here, the operation executed when the customer 4 decides not to view the information of the recommended commodity is not limited to touching another position rather than selecting the 'recommended commodity' button 901. For example, the processor 401 may display a 'next' button different from the 'recommended commodity' button 901 on the registration screen 900. The 'next' button may be selected if the customer 4 prefers a next operation without viewing information of the recommended commodity. That is, the customer 4 deciding not to view the information of the recommended commodity may select the 'next' button.

If the 'recommended commodity' button 901 is selected (Yes in Act 17), the processor 401 displays a recommended commodity list on the registration screen 900 (Act 18).

FIG. 19 illustrates a recommended commodity list. As shown in FIG. 19, the commodity name of each recommended commodity and a 'detail' button 902 are displayed side by side in the recommended commodity list. Further, a 'delete' button 903 is displayed on the registration screen 900.

Each recommended commodity is a commodity having a commodity code contained in the recommendation data paired with the commodity sales data. The processor 401 accesses the store server 40 using the commodity codes contained in the recommendation data. Then, the processor 401 acquires, from the commodity database 41, commodity names associated with the commodity code so as to display a recommended commodity list.

Further, when the processor 501 of the support server 50 adds recommendation data in commodity sales data, the processor 501 may acquire commodity names associated with the commodity codes contained in the recommendation data from the commodity database 41 and include the commodity names in the recommendation data. In this case, the processor 401 of the portable information terminal 400 can display a recommended commodity list with the commodity names contained in the recommendation data.

The customer 4 recognizing the recommended commodity list may select the 'detail' button 902 of a recommended commodity to view the detailed information thereof. When no recommended commodity needs to be viewed, the customer 4 may select the 'delete' button 903.

The processor 401 waits for a selection on the 'delete' button 903 (Act 19) or the 'detail' button 902 (Act 20). The processor 401 wirelessly sends a release command (Act 24) if the 'delete' button 903 is selected (Yes in Act 19). Further, the processor 401 displays the registration screen displayed in Act 14 again (Act 25). Then, the processor 401 waits for detection of a new barcode from an image captured by the camera unit 405 (Act 10). Here, not limited to the foregoing sequence, Act 24 and Act 25 may be executed in a reverse sequence.

The release command is a command to instruct the support server 50 to release a state in which the support server 50 waits for an operation relating to commodity recommendation. The release command wirelessly sent from the wireless unit 406 is received by the relay device 30 and transmitted therefrom to the support server 50 via the LAN 70.

On the other hand, if the 'detail' button 902 is selected (Yes in Act 20), the processor 401 adds the self-registration ID stored in the self-registration management region W1 in the commodity code of the commodity name corresponding to the 'detail' button 902 (hereafter, referred to as a recommended commodity code) and wirelessly sends the processed recommended commodity code (Act 21). The recommended commodity code having the self-registration ID sent from the wireless unit 406 is received by the relay device 30 and transmitted therefrom to the support server 50 via the LAN 70.

As shown in FIG. 15, the processor 501 of the support server 50 sending the pair of the commodity sales data and the recommendation data waits for the release command (Act 49) or the recommended commodity code (Act 50). After receiving the release command (Yes in Act 49), the processor 501 waits for new barcode data from the portable information terminal 400 (Act 35).

After the processor 501 receives the recommended commodity data (Yes in Act 50), the processor 501 searches for recommendation data in the commodity transaction file 510 using the recommended commodity code. Then, the processor 501 increases the reference count Ai corresponding to the recommended commodity code contained in the recommendation data by 1 (Act 51).

Here, the processor 501 cooperates with the commodity transaction file 510 to function as a counting section which counts if the detailed data of a recommended commodity are requested by the portable information terminal 400.

The processor 501 accesses the store server 40 using the recommended commodity code. Then, the processor 501 acquires, from the commodity database 41 of the store server 40, detailed data of commodity associated with the recommended commodity code (Act 52). The processor 501 sends, via the communication interface 504, the detailed data to the portable information terminal 400 from where the recommended commodity code has been originally sent (Act 53).

Here, the processor 501 cooperates with the communication interface 504 to function as a detailed data sending section which sends the detailed data of a recommended commodity to the portable information terminal 400 if the detailed data of the recommended commodity are requested by the portable information terminal 400.

After sending the recommendation information, the processor 501 waits for a new release command (Act 49) or a new recommended commodity code (Act 50). That is, the standby state in Act 49 or Act 50 is a state of waiting for an operation relating to commodity recommendation.

The recommendation information is wirelessly sent from the relay device 30 and received by the wireless unit 406 of the portable information terminal 400 sending the recommended commodity code.

As shown in FIG. 13, the processor 401 of the portable information terminal 400 which has sent the recommended commodity code waits for a response from the support server 50 (Act 22). If recommendation information is received via the wireless unit 406 (Yes in Act 22), the processor 401 displays the recommendation information (a commodity name, a price, a manufacturer, and a commodity image) on the registration screen (Act 23). For example, the recommendation information is displayed in a commodity name display area included in the screen shown in FIG. 19. Then, the processor 401 waits for a selection of the 'delete' button 903 (Act 19) or the 'detail' button 902 (Act 20).

The recommendation information displayed is not limited to the foregoing example. For example, the recommended commodity list displayed may be replaced by recommendation information. In this case, for example, a 'return' button is displayed on the screen. If the 'return' button is selected, the processor 401 returns to carry out Act 18 to display a recommended commodity list again.

In this way, the processor 401 of the portable information terminal 400 carries out Act 10-Act 25 every time the customer 4 photographs the barcode affixed on a commodity 5 using the camera unit 405. On the other hand, the support server 50 carries out Act 38-Act 53. As a result, a commodity transaction file 510 in which the self-registration ID of the customer 4 is stored is formed in the transaction file region W4 of the support server 50. Moreover, the sales data of the commodity 5 is stored in the commodity transaction file 510.

Further, if a recommended commodity is set for the commodity 5, then recommendation data are stored together with the sales data. Moreover, a list of recommended commodities is displayed on the touch panel 404 of the portable information terminal 400 according to the recommendation data.

When the customer 4, recognizing the list, selects a recommended commodity of which detailed information the customer 4 wants to view, the recommendation information of the recommended commodity is displayed on the touch panel 404 of the portable information terminal 400. Thus, before settling the purchased commodities, the customer 4 can acquire, in real time, the information of a recommended commodity relating to a purchased commodity that the customer 4 wants to purchase.

On the other hand, the reference count Ai of the recommended commodity contained in the recommendation data stored in the commodity transaction file 510 is counted up in the support server 50. The reference count Ai is reset to '0' when the recommendation data are registered in the commodity transaction file 510. In this way, for each recommended commodity, the number of times that the customers 4 view the recommendation information of the recommended commodity is counted in the support server 50.

Further, if a recommended commodity recommended for a commodity that the customer 4 wants to purchase is purchased by the customer 4, the purchase count Bi of the recommended commodity contained in the recommendation data stored in the commodity transaction file 510 is counted up. The purchase count Bi is reset to '0' when the recommendation data are registered in the commodity transaction file 510. In this way, the quantities of recommended commodities purchased by the customer 4 are counted in the support server 50.

The customer 4, after completing the shopping in the sales floor 6, goes to the settlement region 1 to settle the commodities to be purchased. The settlement may be carried out at the checkout counter 2 or using the self-service POS apparatus 20. To settle the commodities at the checkout counter 2, the customer 4 photographs the barcode 7 marked on the scanner 11 located on the checkout counter 2 using the camera unit 405. To settle the payment for the commodities using the self-service POS apparatus 20, the customer 4 photographs the barcode 7 marked on the POS apparatus 20 using the camera unit 405.

When the customer 4 photographs the barcode 7 using the camera unit 405, the processor 401 of the portable information terminal 400 carries out the same operation as the operation the processor 401 does when the customer 4 photographs the barcode affixed on a commodity 5. That is, if a barcode is detected from an image captured by the camera unit 405 (Yes in Act 10), the processor 401 wirelessly sends the self-registration ID stored in the self-registration management region W1 together with the data of the barcode (Act 11). The barcode data and the self-registration ID sent from the wireless unit 406 is received by the relay device 30 and transmitted therefrom to the support server 50 via the LAN 70.

After receiving the barcode data and the self-registration ID (Yes in Act 35), the processor 501 of the support server 50 determines whether the barcode data are a commodity code (Act 36) or a POS ID (Act 37). If the barcode data are a POS ID (Yes in Act 37), the processor 501 determines that the POS apparatus 10 or 20 corresponding to the POS ID is a POS apparatus serving as settlement object (hereinafter referred to as a settlement POS apparatus) (Act 54).

For example, the processor 501 inquires each of the POS apparatuses 10 and 20 that are connected via the LAN 70 about the POS ID thereof. Then, the processor 501 determines that the POS apparatus 10 or 20 which responds with a POS ID detected from the barcode data is a settlement POS apparatus. The processor 501 sends a settlement request command to the settlement POS apparatus 10 or 20 (Act 55) if the settlement POS apparatus 10 or 20 is determined. The settlement request command is an instruction that the settlement POS apparatus 10 or 20 carry out a settlement process. The settlement request command is sent to the settlement POS apparatus 10 or 20 via the LAN 70.

The processor 101 of the settlement POS apparatus 10 or 20 receiving the settlement request command carries out a process according to the procedures shown in FIG. 16. That is, the processor 101 determines whether or not a commodity transaction is being continued (Act 71).

In the case of the self-service POS apparatus 20, the commodity transaction of a customer 4 is ended when another customer 4 photographs a barcode 7 using the camera unit 405 of the portable information terminal 400. However, in the case of the facing-type POS apparatuses 10, the commodity transaction of a customer 4 may not be ended when another customer 4 photographs a barcode 7 using the camera unit 405 of the portable information terminal 400. If the commodity transaction of a customer is not ended, the processor 101 determines that a commodity transaction is being continued. In this case (Yes in Act 71), the processor 101 waits until the commodity transaction is completed. If the commodity transaction has been completed (No in Act 71), the processor 101 sends an approval response to the support server 50 (Act 72).

As shown in FIG. 14, the processor 501 of the support server 50 which has sent the settlement request command to the settlement POS apparatus 10 or 20 waits to receive an approval response (Act 56). After receiving the approval response from the settlement POS apparatus 10 or 20 (Yes in Act 56), the processor 501 searches the commodity transaction region W4 using the self-registration ID added to the barcode data. Then, the processor 501 sends the data contained in the commodity transaction file 510 containing the self-registration ID to the settlement POS apparatus 10 or 20 via the communication interface 504 (Act 57).

That is, the processor 501 cooperates with the communication interface 504 to function as a commodity data sending section which sends the commodity data stored in the sales data storage section to the POS apparatus 10 or 20 determined according to the data input from the portable information terminal 400, and an output section which outputs the count value obtained by the counting section.

As shown in FIG. 16, the processor 101 of the settlement POS apparatus 10 or 20 which has sent the approval response to the support server 50 waits to receive the commodity transaction file 510 (Act 73). If the processor 101 receives the data contained in the commodity transaction file 510 from the support server 50 via the communication interface 504 (Yes in Act 73), the processor 101 loads the commodity sales data contained in the commodity transaction file 510 to the transaction region of the main memory 102. Then, the processor 101 displays the commodity name, the price, and the other information of the commodity sales data loaded in the transaction region on the display 13a or the touch panel 22 (Act 74).

Further, the processor 101 updates, according to the recommendation data contained in the commodity transaction file 510, the reference count Ai and the purchase count Bi contained in a matched recommendation data record 42R stored in the recommendation database 42. Specifically, if the reference count Ai corresponding to the commodity code contained in the recommendation data is a value '1' or above, the processor 101 adds the value to the reference count Ai corresponding to the same commodity code contained in the recommendation data record 42R. If the purchase count Bi corresponding to the commodity code contained in the recommendation data is a value '1' or above, the processor 101 adds the value to the purchase count Bi corresponding to the same commodity code contained in the recommendation data record 42R (Act 75).

Subsequently, the processor 101 waits for input of payment data (Act 76). Further, if the barcode of a commodity is read by the scanner 11 or 21 while the processor 101 is waiting for the input of payment data, the processor 101 determines the commodity according to the barcode and adds the sales data of the commodity in the transaction region.

If payment data are input via the keyboard 12 or the touch panel 22 (Yes in Act 76), the processor 101 carries out, according to the payment data, a settlement process for the commodity sales data stored in the transaction region (settlement module). During the settlement process, the processor 101 generates receipt data to be printed (Act 77: a first generation module).

After the settlement process is ended, the processor 101 checks the association flag F contained in the commodity transaction file 510 sent from the support server 50 (Act 78). Herein, the association flag F of '1' means that the customer 4 completing a self-registration process sets the association of the self-scanning system with the electronic receipt system. If the association of the self-scanning system with the electronic receipt system is set (Yes in Act 78), the processor 101 generates an electronic receipt by formatting the receipt data (Act 79: a second generation module). Further, the processor 101 displays, on the display 13a or the touch panel 22, a screen to inquire the customer 4 of whether or not to issue a paper receipt. Then, the processor 101 waits for an input on whether or not to issue a paper receipt (Act 80).

If an input indicating no issue of a paper receipt by the keyboard 12 or touch panel 22 is received (No in Act 80), the processor 101 attaches the self-registration ID contained in the commodity transaction file 510 to the data of the electronic receipt. Then, the processor 101 sends the data of the electronic receipt together with the self-registration ID to the electronic receipt server 80 (Act 81: an electronic receipt sending module).

On the other hand, if an input indicating issue of a paper receipt by the keyboard 12 or touch panel 22 is received (Yes in Act 80), the processor 101 controls the printer 14 or 24 to issue a paper receipt (Act 82). Further, if the association flag F contained in the commodity transaction file 510 is set as '0' (No in Act 78), the processor 101 causes a paper receipt to be issued (Act 82).

Then, the processor 101 sends a settlement end command to the support server 50 (Act 83) if the data of the electronic receipt are sent to the electronic receipt server 80 or the issue of a paper receipt is instructed. Then, the processor 101 ends the process carried out when a settlement request command is received.

As shown in FIG. 14, the processor 501 of the support server 50 which has sent the data contained in the commodity transaction file 510 to the settlement POS apparatus 10 or 20 waits to receive a settlement end command (Act 58). If the processor 501 receives the settlement end command from the settlement POS apparatus 10 or 20 (Yes in Act 58), the processor 501 wirelessly sends the settlement end command to the portable information terminal 400 which has sent the barcode data representing a POS ID (Act 59). Then, the processor 501 deletes, from the transaction file region W4, the commodity transaction file 510 that has been sent to the settlement POS apparatus 10 or 20 (Act 60). Then, the processor 501 ends the process carried out after a registration start command is received. Further, not limited to the foregoing sequence, Act 59 and Act 60 may be executed in a reverse sequence. Further, the commodity transaction file 510 deleted from the transaction file region W4 may also be stored in another area formed in the auxiliary storage device 503.

As shown in FIG. 12, the processor 401 of the portable information terminal 400 which has sent the barcode data waits to receive data from the support server 50 (Act 12). If the processor 401 receives the data from the support server 50 (Yes in Act 12), the processor 401 determines whether or not the data received are commodity sales data (Act 13). If the data received are not commodity sales data (No in Act 13), the processor 401 determines whether or not the data received are an end command (Act 26). If the data received are an end command (Yes in Act 26), the processor 401 deletes the registration screen displayed on the touch panel 404 (Act 27). Then, the processor 401 ends the process carried out according to the self-registration terminal program P1.

Figure 17:
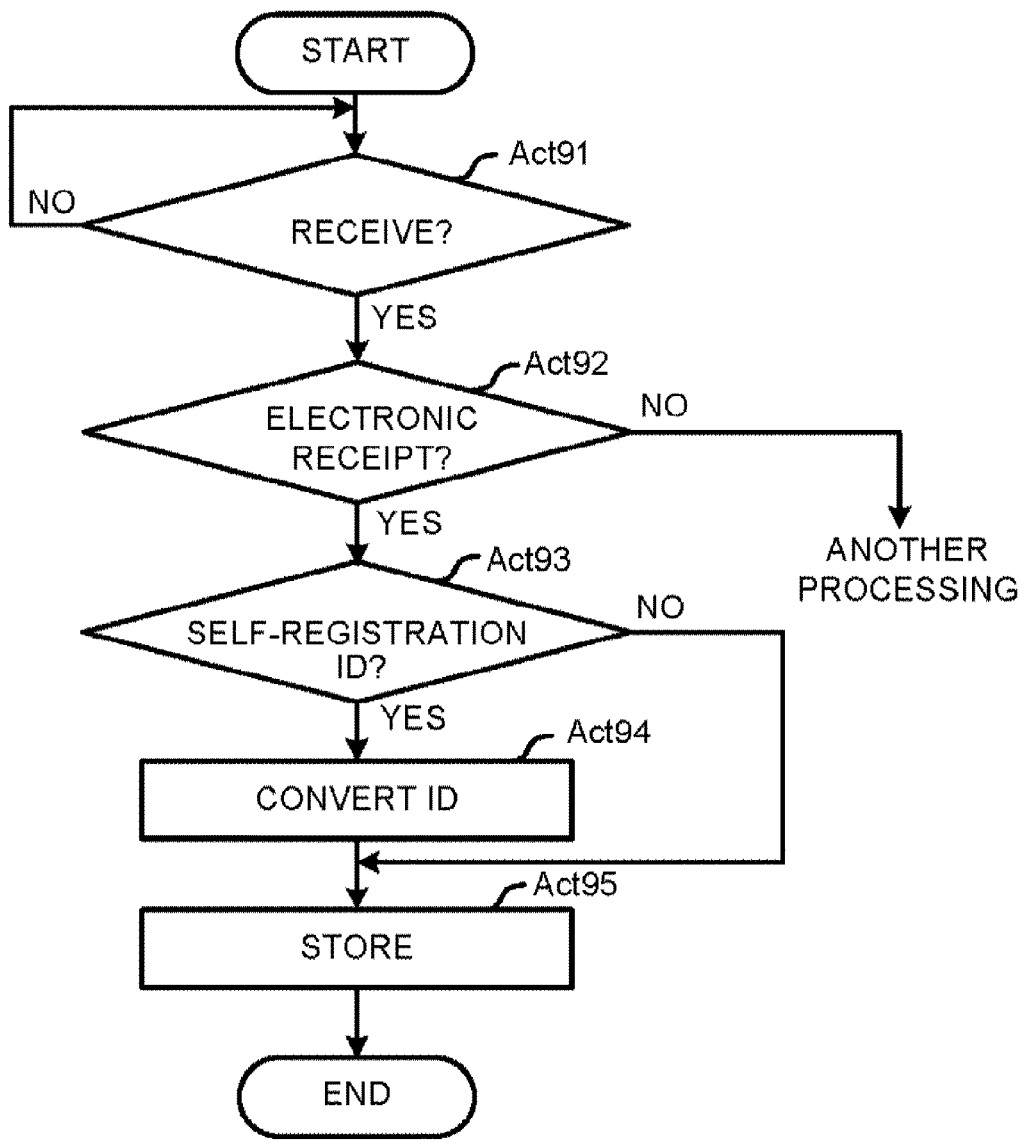
FIG. 17 is a flowchart illustrating procedures of a process carried out by a processor of the electronic receipt server according to an electronic receipt server program.

As shown in FIG. 17, the processor 801 of the electronic receipt server 80 waits to receive data (Act 91). If the processor 801 receives the data via the network 200 (Yes in Act 91), the processor 801 determines whether or not the data received are the data of an electronic receipt (Act 92).

If it is determined that the data received are the data of an electronic receipt (Yes in Act 92), the processor 801 determines whether or not the ID added to the data is a self-registration ID or an electronic receipt ID (Act 93).

If an electronic receipt ID is added to the data of the electronic receipt (No in Act 93), the processor 801 generates an electronic receipt file 810 containing the electronic receipt ID and the data of the electronic receipt, and stores the generated electronic receipt file 810 in the electronic receipt region W5 (Act 95).

If a self-registration ID is added to the data of the electronic receipt (Yes in Act 93), the processor 801 searches the linkage table 820. Then, the processor 801 converts the self-registration ID to an electronic receipt ID which is associated with the self-registration ID and set in the linkage table 820 (Act 94). After converting the self-registration ID to the electronic receipt ID, the processor 801 generates an electronic receipt file 810 containing the electronic receipt ID generated through the conversion and the data of the electronic receipt, and stores the generated electronic receipt file 810 in the electronic receipt region W5 (Act 95). Then, the processor 801 ends the process carried out after receiving the data of an electronic receipt.

Here, the conversion of the self-registration ID to an electronic receipt ID may not be included in Act 94. The processor 801 may only extract the electronic receipt ID which is set in the linkage table 820 in association with the self-registration ID. That is, in Act 95, the processor 801 may generate an electronic receipt file 810 containing the extracted electronic receipt ID and the data of the electronic receipt, and store the generated electronic receipt file 810 in the electronic receipt region W5.

In this way, the processor 401 of the portable information terminal 400 carries out Act 10-Act 13, Act 26, and Act 27, every time the customer 4 photographs a barcode representing a POS ID using the camera unit 405. On the other hand, the support server 50 carries out Act 54-Act 60. Further, the POS apparatus 10 or 20 corresponding to the POS ID carries out Act 71-Act 83. As a result, the commodities registered through a self-registration by the customer 4 are settled in the POS apparatus 10 or 20 associated with the set POS ID. If the customer 4 sets the association of the self-service commodity data input system with the electronic receipt system, then a receipt for a settled commodity transaction is stored in the electronic receipt server 80 as an electronic receipt. The electronic receipt stored in the electronic receipt server 80 can be viewed using the information processing apparatus 210 including the portable information terminal 400 through logging in the electronic receipt server by the customer using an electronic receipt ID.

Further, in Act 75, the processor 101 of the POS apparatus 10 or 20 associated with the POS ID updates, according to the recommendation data contained in the commodity transaction file 510, the reference count Ai and the purchase count Bi contained in a matched recommendation data record 42R stored in the recommendation database 42. Consequentially, for each recommended commodity, the number of times customers 4 viewed the recommendation information of the recommended commodity during a self-registration process is counted in the recommendation database 42. Further, the quantities customers 4 purchased each recommended commodity is also counted in the recommendation database 42.

Thus, based on the reference count Ai and the purchase count Bi counted in the recommendation database 42, a promotion effect of the recommended commodity can be numerically obtained.

Although detailed embodiments are described above, the present invention is not limited to the above embodiments.

For example, in the above embodiments, the data of a purchased commodity and that of a related commodity (recommended commodity) are stored in the commodity transaction file 510 associated with each other. Alternatively, the data of the commodity and that of the related commodity may be stored in different files, instead of the same file. In short, no limitations are given to the storage of the data of a commodity determined according to a commodity code input from the portable information terminal 400 and the data of a related commodity relating to the commodity as long as the data are stored in an associated manner.

Further, the reference count Ai and the purchase count Bi of each related commodity, although counted in the above embodiments, may not be both counted. The promotion effect can also be obtained by counting one of the reference count Ai and purchase count Bi of each related commodity.

Further, in the above embodiments, the store server 40 and the support server 50 are arranged in the retail store 100. The functions of both the store server 40 and the support server 50 may be integrated in one server.

Further, the recommendation database 42 may not be included in the commodity sales processing system of the retail store 100. The recommendation database 42 may be located in a server of a network 200 for commodity sales processing systems of different retail stores 100 to share. In this case, when the commodity transaction file 510 is sent to the settlement POS apparatus in Act 57 in FIG. 14, the support server at least sends (outputs) the recommendation data stored in the commodity transaction file 510 to the server on the network 200.

Further, the portable information terminal 400 is not necessarily carried by a customer 4. For example, the portable information terminal 400 may be replaced by an information terminal mounted on a shopping cart that the customer handles.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A method for distributing purchase recommendations to a user terminal and tracking effectiveness of the purchase recommendations, the method comprising:
providing a self-registration program in a user terminal, the self-registration program configuring the user terminal to permit a user to capture an image associated with a product selected by the user, to generate a product code for the product from the captured image, and to transmit the product code to a wireless device that is connected to a store server over a network;
receiving the captured image from the user terminal at a store server through the wireless device, the store server connected to a first database from which the store server retrieves product information relating to the product code, the product information including a product name, a unit price, and one or more recommended products associated with the product corresponding to the product code, and a second database for storing information for tracking effectiveness of recommendations with respect to the one or more recommended product associated with the product corresponding to the product code; and
transmitting the product information to the user terminal through the wireless device, wherein
the presence of at least one recommended product in the product information causes the self-registration program to display a user interface for accessing information about the recommended product on the user terminal and track the user inputs made through the user interface to enable the store server to update the second database,
the self-registration program, when executing, causes the user terminal to communicate with a support server that is executing a self-registration server program,
the support server tracks the number of times, N1, a recommended product has been purchased and the number of times, N2, detailed information about the recommended product has been viewed, and
a user input through the user interface requesting to view detailed information about the recommended product causes the detailed information to be displayed on the user interface and the value of N2 for the recommended product to be incremented.

2. The method of claim 1, wherein when the user indicates a desire to purchase the recommended product, value of N1 for the recommended product is incremented.

3. The method of claim 1, wherein the store server stores tracking information in the second database indicating a total number of times each recommended product has been purchased and a total number of times detailed information about each recommended product has been viewed.

4. The method of claim 3, wherein the store server, during a settlement process of the product, updates the tracking information in the second database.

5. The method of claim 4, wherein the support server, the store server, and the wireless device communicate with each other over the network.

6. The method of claim 1, wherein the captured image includes an image of a bar code or a QR code.

* * * * *